United States Patent
Ito et al.

(10) Patent No.: US 6,378,297 B1
(45) Date of Patent: Apr. 30, 2002

(54) AIR-FUEL CONTROL SYSTEM FOR EXHAUST GAS PURIFICATION ON ICE

(75) Inventors: Takekazu Ito, Shizuoka-ken; Shizuo Sasaki, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/496,349

(22) Filed: Feb. 2, 2000

(30) Foreign Application Priority Data

Dec. 16, 1999 (JP) .......................................... 11-357718

(51) Int. Cl.$^7$ ............................................... F01N 3/00
(52) U.S. Cl. .............................. 60/284; 60/285; 60/286
(58) Field of Search .......................... 60/274, 284, 285, 60/286, 295

(56) References Cited

U.S. PATENT DOCUMENTS

| | | | | |
|---|---|---|---|---|
| 4,686,827 A | * | 8/1987 | Wade et al. ................... | 60/286 |
| 5,207,058 A | * | 5/1993 | Sasaki et al. .................. | 60/284 |
| 5,826,425 A | * | 10/1998 | Rossi Sebastiano et al. .. | 60/274 |
| 5,839,275 A | * | 11/1998 | Hirota et al. .................. | 60/286 |
| 5,910,096 A | * | 6/1999 | Hepburn et al. ............... | 60/274 |
| 6,021,767 A | * | 2/2000 | Yasui et al. .................... | 60/285 |
| 6,044,642 A | * | 4/2000 | Nishimura et al. ............ | 60/285 |
| 6,131,388 A | * | 10/2000 | Sasaki et al. .................. | 60/286 |
| 6,141,960 A | * | 11/2000 | Takami et al. ................. | 60/286 |
| 6,173,571 B1 | * | 1/2001 | Kaneko et al. ................ | 60/286 |
| 6,240,723 B1 | * | 6/2001 | Ito et al. ........................ | 60/286 |

FOREIGN PATENT DOCUMENTS

| | | |
|---|---|---|
| DE | 195 43 219 C1 | 12/1996 |
| EP | 0 879 946 A2 | 11/1998 |
| EP | 0 891 806 A2 | 1/1999 |
| JP | 9-32619 A | 2/1997 |
| WO | WO 98/10177 | 3/1998 |
| WO | WO 98/13128 | 4/1998 |

* cited by examiner

Primary Examiner—Thomas Denion
Assistant Examiner—Tu M. Nguyen
(74) Attorney, Agent, or Firm—Oliff & Berridge, PLC

(57) ABSTRACT

An exhaust gas after-treatment device arranged in an exhaust passage of an engine, which raises the temperature of the exhaust gas after-treatment device by making selective use of a first injection pattern injecting only main fuel and delaying the injection timing of the main fuel $Q_R$, a second injection pattern injecting auxiliary fuel $Q_v$ near top dead center of the suction stroke and delaying the injection timing of the main fuel $Q_R$, and a third injection pattern injecting auxiliary fuel $Q_v$ and $Q_p$ before injection of the main fuel and after injection and delaying the injection timing of the main fuel $Q_R$.

36 Claims, 24 Drawing Sheets

TQ | $\theta S_{11}$  $\theta S_{12}$  ------------  $\theta S_{1n}$
   | $\theta S_{21}$                                    ⋮
   |    ⋮
   | $\theta S_{m1}$  ----------------  $\theta S_{mn}$
   |_____ N

TQ | $\theta S_{11}$   $\theta S_{12}$ ------------ $\theta S_{1n}$
   | $\theta S_{21}$
   |    ⋮                                            ⋮
   | $\theta S_{m1}$ -------------------- $\theta S_{mn}$
   |_____ N

AIR-FUEL CONTROL SYSTEM FOR EXHAUST GAS PURIFICATION ON ICE

BACKGROUND OF THE INVENTION

1. Field of the Invention

The present invention relates to an internal combustion engine.

2. Description of the Related Art

As an exhaust gas after-treatment device arranged in the exhaust passage of an engine, there is known an $NO_x$ absorbent which absorbs the $NO_x$ in exhaust gas when. the air-fuel ratio of the exhaust gas is lean and releases and reduces the absorbed $NO_x$ when the air-fuel ratio of the exhaust gas becomes the stoichiometric air-fuel ratio or rich. In such an exhaust gas after-treatment device, the air-fuel ratio of the exhaust gas is temporarily made rich before the $NO_x$ absorption capability of the $NO_x$ absorbent becomes saturated so as to make all of the $NO_x$ absorbed in the $NO_x$ absorbent be released from the $NO_x$ absorbent and reduced.

Fuel, however, contains sulfur. Therefore, the exhaust gas contains $SO_x$. This $SO_x$ is also absorbed by the $NO_x$ absorbent. This $SO_x$ is not released from the $NO_x$ absorbent just by making the air-fuel ratio of the exhaust gas rich. To make the $SO_x$ be released from the $NO_x$ absorbent, it is necessary to raise the temperature of the $NO_x$ absorbent. Therefore, there is known an internal combustion engine wherein when the temperature of the $NO_x$ absorbent should be raised, additional fuel is injected in the expansion stroke or exhaust stroke in addition to the main fuel injected during the suction stroke and that additional fuel is made to burn in the $NO_x$ absorbent so as to raise the temperature of the $NO_x$ absorbent (see Japanese Unexamined Patent Publication (Kokai) No. 9-32619).

In this way, in an internal combustion engine, it is sometimes necessary to raise the temperature of the exhaust gas after-treatment device. In this case, in an internal combustion engine, there are sometimes cases where it is necessary to rapidly raise the temperature of the exhaust gas after-treatment device. Further, there are sometimes cases where conversely it is necessary to slowly raise the temperature of the exhaust gas after-treatment device. That is, it becomes, necessary to be able to change the temperature raising rate of the exhaust gas after-treatment device in accordance with demand. In the above known internal combustion engine, however, when raising the temperature of the exhaust gas after-treatment device, a predetermined injection pattern determined by the operating state of the engine was used. As a result, there was the problem that it was not possible to freely change the temperature raising rate of the exhaust gas after-treatment device in accordance with demand.

SUMMARY OF THE INVENTION

An object of the present invention is to provide an internal combustion engine capable of raising a temperature of an exhaust gas after-treatment device at a temperature raising rate which is required for the exhaust gas after-treatment device.

According to the present invention, there is provided an internal combustion engine having a combustion chamber and an exhaust passage, the engine comprising fuel injection means for injecting an auxiliary fuel into the combustion chamber, in addition to a main fuel, in accordance with necessity to produce unburned hydrocarbons; an exhaust gas after-treatment device arranged in the exhaust passage, a temperature of the exhaust gas after-treatment device rising when a temperature of exhaust gas rises and rising when unburned hydrocarbons are supplied to the exhaust gas after-treatment device; and injection control means for retarding an injection timing of the main fuel when the temperature of the exhaust gas after-treatment device should rise, as compared with the case where the temperature of the exhaust gas after-treatment device should not rise, at least two injection patterns, which are different in at least one of an amount of retardation of the injection timing of the main fuel and injection timing of the auxiliary fuel, being determined in advance to raise the temperature of the exhaust gas after-treatment device, the injection control means choosing any one of the injection patterns in accordance with a demand for a temperature raising rate of the exhaust gas after-treatment device and injecting fuel in accordance with the chosen injection pattern when the temperature of the exhaust gas after-treatment device should rise.

BRIEF DESCRIPTION OF THE DRAWINGS

The present invention will be more fully understood from the description of preferred embodiments of the invention set forth below, together with the accompanying drawings, in which:

FIGS. 4A and 4B are views of maps of injection amounts etc.;

FIGS. 16A and 16B are views of maps of the target degree of opening etc. of a throttle valve;

DESCRIPTION OF THE PREFERRED EMBODIMENTS

Figure 1:
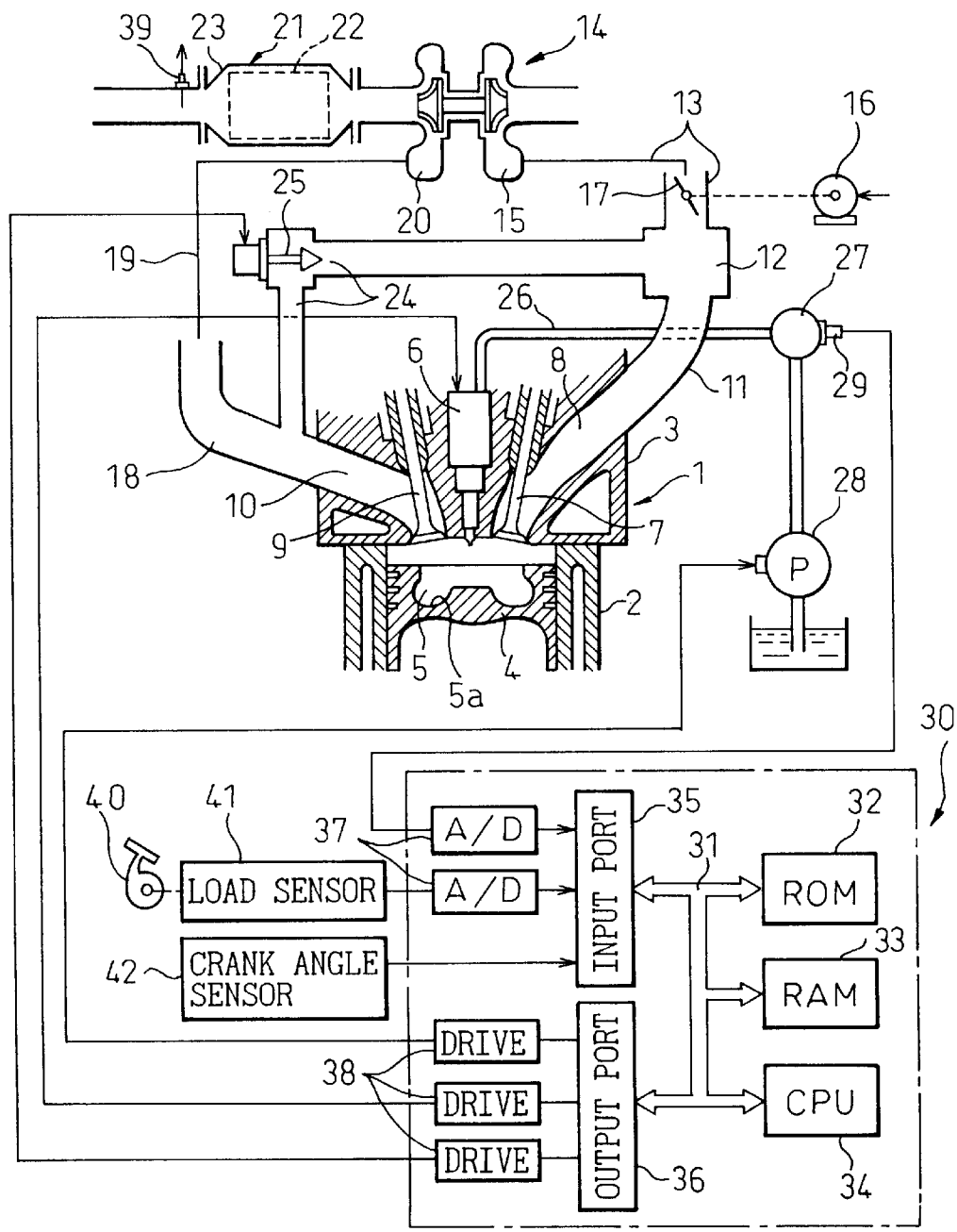
FIG. 1 is an overview of an internal combustion engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to a surge tank 12. The surge tank 12 is connected through an intake duct 13. to a compressor 15 of an exhaust turbocharger 14. A throttle valve 17 driven by a step motor 16 is arranged in the intake duct 13.

On the other hand, the exhaust port 10 is connected through an exhaust manifold 18 and exhaust tube 19 to an exhaust turbine 20 of the exhaust turbocharger 14. The outlet of the exhaust turbine 20 is connected to an exhaust gas after-treatment device 21. In the embodiment shown in FIG. 1, the exhaust gas after-treatment device 21 is comprised of an $NO_x$ absorbent 22 and a casing 23 housing the $NO_x$ absorbent 22.

The exhaust manifold 18 and the surge tank 12 are connected to each other through an exhaust gas recirculation (EGR) passage 24. An EGR control valve 25 is arranged in the EGR passage 24. Each fuel injector 6 is connected through a fuel supply line 26 to a fuel reservoir, that is, a so-called common rail 27. Fuel is supplied into this common rail 27 from an electronically controlled variable discharge fuel pump 28. The fuel supplied into the common rail 27 is supplied through the fuel supply lines 26 to the fuel injectors 6. The common rail 27 has mounted in it a fuel pressure sensor for detecting the fuel pressure in the common rail 27. The amount of discharge of the fuel pump 28 is controlled based on the output signal of the fuel pressure sensor 29 so that the fuel pressure in the common rail 27 becomes a target fuel pressure.

The electronic control unit 30 is comprised of a digital computer and is provided with a read only memory (ROM) 32, a random access memory (RAM) 33, a microprocessor (CPU) 34, an input port 35, and an output port 36 connected with each other by a bidirectional bus 31. Downstream of the $NO_x$ absorbent 22 is arranged a temperature sensor 39 for detecting the temperature of the $NO_x$ absorbent 22. The output signals of the temperature sensor 39 and the fuel pressure sensor 29 are input through corresponding A/D converters 37 to the input port 35. The accelerator pedal 40 has connected to it a load sensor 41 for generating an output voltage proportional to the amount of depression of the accelerator pedal 40. The output voltage of the load sensor 41 is input through a corresponding AD converter 37 to the input port 35. Further, the input port 35 has connected to it a crank angle sensor 42 for generating an output pulse every time the crank shaft rotates by for example 30 degrees. On the other hand, the output port 36 has connected to it through corresponding drive circuits 38 the fuel injectors 6, step motor 16, EGR control valve 25, and fuel pump 28.

Figure 2A:
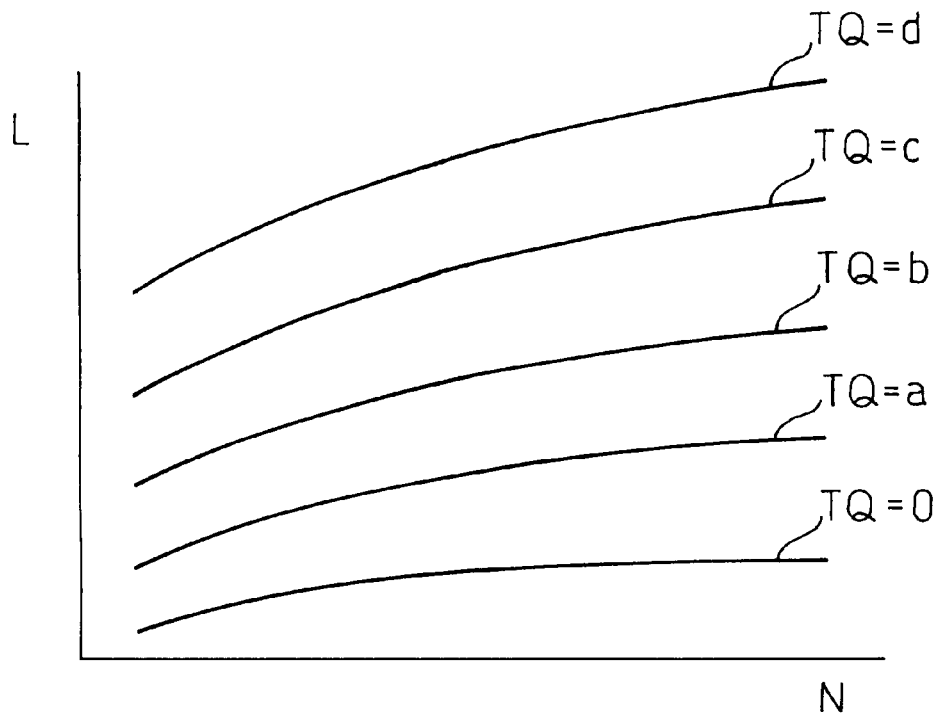
FIGS. 2A and 2B are views of a required torque.
Figure 2B:
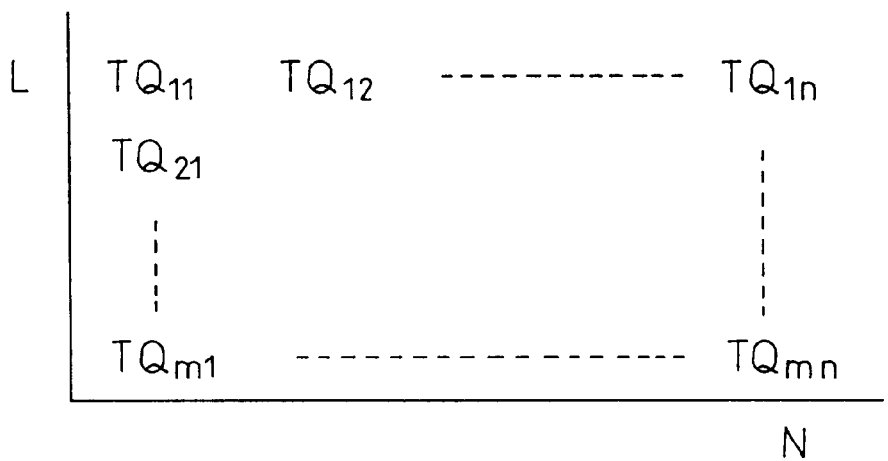

FIG. 2A shows the relationship between the required torque TQ, the amount of depression L of the accelerator pedal 40, and the engine rotational speed N. Note that in FIG. 2A, the curves show equivalent torque curves. The curve shown by TQ=0 shows that the torque is zero, while the remaining curves have gradually higher required torques in the order of TQ=a, TQ=b, TQ=c, and TQ=d. The required torques TQ shown in FIG. 2A are stored in the ROM 32 in advance in the form of a map as a function of the amount of depression L of the accelerator pedal 40 and the engine rotational speed N as shown in FIG. 2B. In this embodiment according to the present invention, the required torque TQ is first calculated in accordance with the amount of depression L of the accelerator pedal 40 and the engine rotational speed N from the map shown in FIG. 2B and then the amount of fuel injection etc. are calculated based on the required torque TQ.

Figure 3:
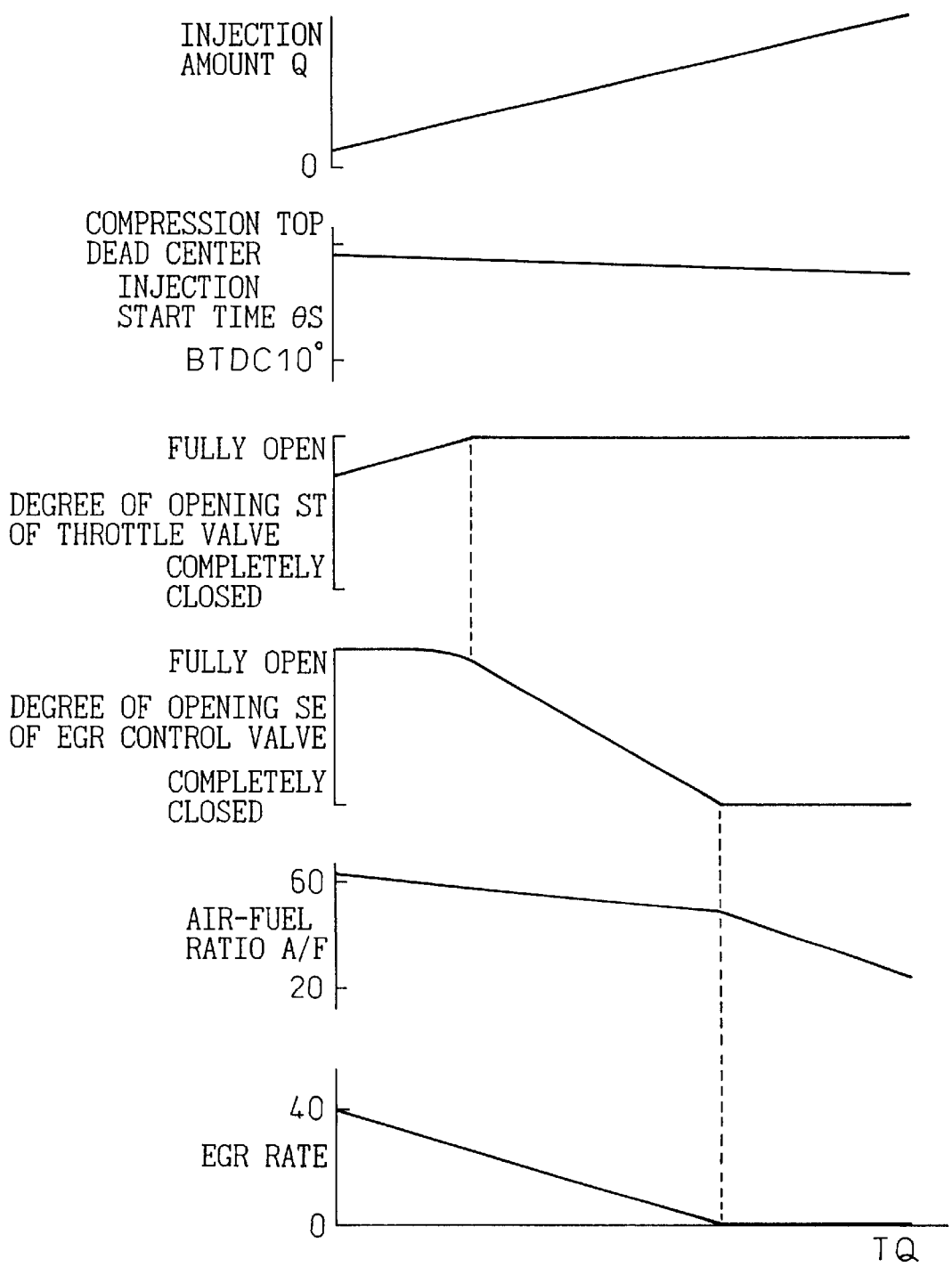
FIG. 3 is a view of a throttle valve degree of opening and an EGR control valve degree of opening etc.

FIG. 3 shows the amount of injection Q at the time of ordinary operation, the injection start timing θS, the degree of opening ST of the throttle valve 17, the degree of opening SE of the EGR control valve 25, the mean air-fuel ratio A/F of the air-fuel mixture in the combustion chamber 5, and the EGR rate (amount of EGR gas/(amount of intake air+amount of EGR gas). Note that in FIG. 3, the abscissa shows the required torque TQ.

As shown in FIG. 3, at the time of ordinary operation, the injection start timing θS is made before top dead center of the compression stroke. On the other hand, the EGR rate falls the higher the required torque TQ. The ER rate becomes zero in the region of the high required torque TQ. The degree of opening ST of the throttle valve 17 and the degree of opening SE of the EGR control valve 25 are made to change so that the EGR rate changes as explained above. That is, the degree of opening ST of the throttle valve 17 is made to increase as the required torque TQ becomes higher in the region of a low required torque TQ. The throttle valve 17 is made to fully open when the required torque TQ becomes further higher. Further, the EGR valve 25 is made to fully open in the region of a low required torque TQ and made to completely close in the region of a high required torque TQ. Between the region of the low required torque TQ and the region of the high required torque TQ, the degree of opening SE of the EGR valve 25 is gradually reduced as the required torque TQ becomes higher. Further, it is made smaller when the mean air-fuel ratio A/F in the combustion chamber 5 is lean and the required torque TQ becomes higher.

Figure 5A:
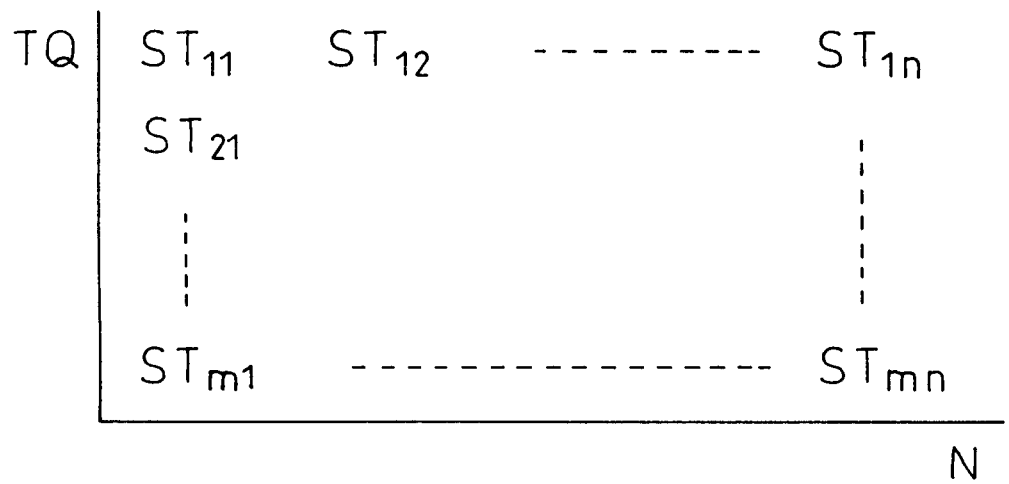
FIGS. 5A and 5B are views of maps of target degrees of opening of a throttle valve etc.
Figure 5B:
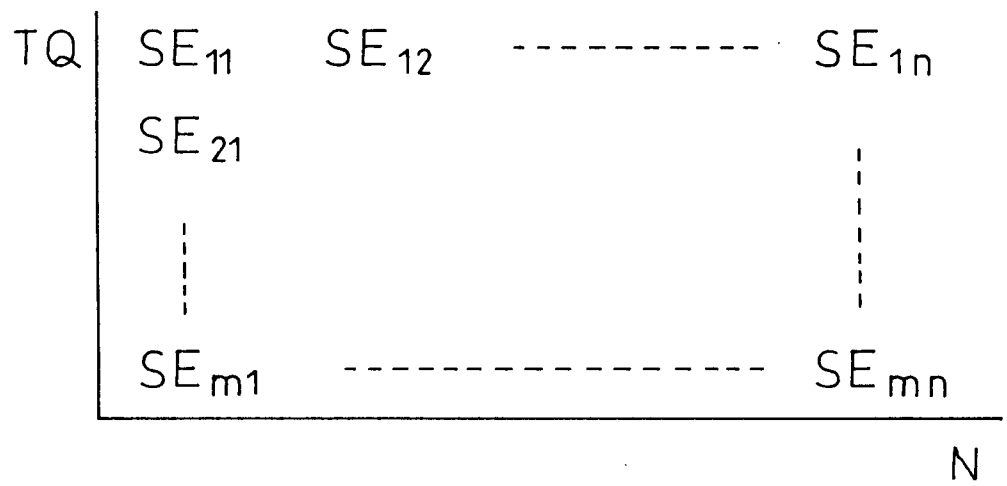

The amount of injection Q, the injection start timing θS, the degree of opening ST of the throttle valve 17, and the degree of opening SE of the EGR control valve 25 are not functions of just the required torque TQ, but are functions of the required torque TQ and the engine rotational speed N. In this embodiment according to the present invention, as shown in FIG. 4A, the amount of injection Q is stored in advance in the ROM 32 in the form of a map as a function of the required torque TQ and the engine rotational speed N. As shown in FIG. 4B, the injection start timing θS is also stored in advance in the ROM 32 in the form of a map as a function of the required torque TQ and the engine rotational speed N. Further, the degree of opening ST of the throttle valve 17, as shown in FIG. 5A, is stored in advance in the ROM 32 in the form of a map as a function of the required torque TQ and the engine rotational speed N, while the degree of opening SE of the EGR control valve 25, as shown in FIG. 5B, is stored in advance in the ROM 32 in the form of a map as a function of the required torque TQ and the engine rotational speed N.

Now, the $NO_x$ absorbent 22 housed in the casing 23 in FIG. 1 is comprised of for example alumina as a carrier and, carried on that carrier, for example, at least one element selected from potassium K, sodium Na, lithium Li, cesium Cs, and other alkali metals, barium Ba, calcium Ca and other alkali earth metals, and lanthanum La, yttrium Y, and other rare earths plus a rare metal such as platinum. If the ratio of the air and fuel (hydrocarbons) supplied into the engine intake passage, combustion chamber 5, and exhaust passage upstream of the $NO_x$ absorbent 22 is referred to as the air fuel ratio of the exhaust gas flowing into the $NO_x$ absorbent 22, then the $NO_x$ absorbent 22 performs an $NO_x$ absorption and release action in which it absorbs $NO_x$ when the air-fuel ratio of the inflowing exhaust gas is lean while releases the absorbed $NO_x$ when the air-fuel ratio of the inflowing exhaust gas becomes the stoichiometric air-fuel ratio or rich.

If this $NO_x$ absorbent 22 is placed in the engine exhaust passage, the $NO_x$ absorbent 22 will in actuality perform an $NO_x$ absorption and release action, but there are portions of the detailed mechanism of this absorption and release action which are still not clear. This absorption and release action, however, is considered to be performed by the mechanism shown in FIGS. 6A and 6B. Next, this mechanism will be explained taking as an example the case of carrying platinum Pt and barium Ba on the carrier, but the same mechanism applies even if using another precious metal and alkali metal, alkali earth, or rare earth.

Figure 6A:
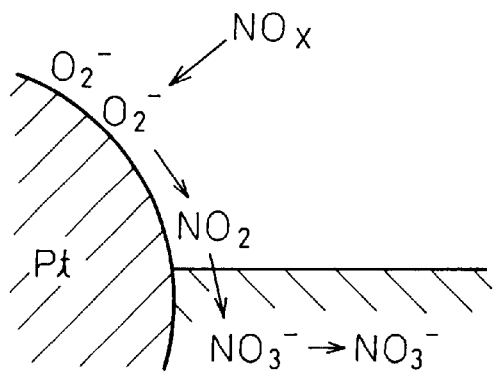
FIGS. 6A and 6B are views for explaining an absorption and release action of $NO_x$.

In the internal combustion engine shown in FIG. 1, combustion is performed when the mean air-fuel ratio in the combustion chamber 5 is in a lean state. When combustion is performed with the mean air-fuel ratio in a lean state in this way, the concentration of oxygen in the exhaust gas is high. At this time, as shown in FIG. 6A, the oxygen $O_2$ deposits on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \to 2NO_2$). Next, part of the produced $NO_2$ is oxidized on the platinum Pt and absorbed in the absorbent and diffuses inside the absorbent in the form of nitrate ions $NO_3^-$ as shown in FIG. 6A while bonding with the barium oxide BaO. The $NO_x$ is absorbed in the $NO_x$ absorbent 22 in this way. So long as the concentration of oxygen in the inflowing exhaust gas is high, $NO_2$ is produced on the surface of the platinum Pt. So long as the $NO_x$ absorption capability of the absorbent does not become saturated, the $NO_2$ is absorbed in the absorbent and nitrate ions $NO_3^-$ are produced.

Figure 6B:
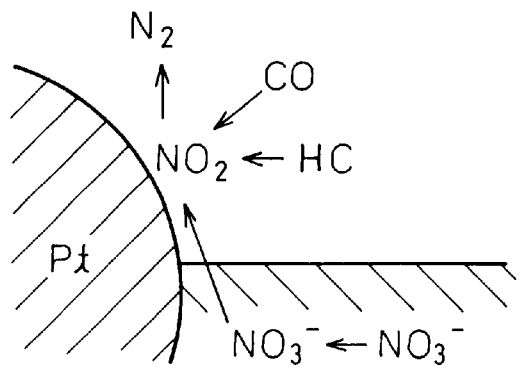

On the other hand, when the air-fuel ratio of the inflowing exhaust gas is made rich, the concentration of oxygen in the inflowing exhaust gas falls and as a result the amount of production of $NO_2$ on the surface of the platinum Pt falls. If the amount of production of $NO_2$ falls, the reaction proceeds in the reverse direction ($NO_3^- \to NO_2$) and therefore the nitrate ions $NO_3^-$ in the absorbent are released from the absorbent in the form of $NO_2$. At this time, the $NO_x$ released from the $NO_x$ absorbent 22 reacts with the large amount of unburnt hydrocarbons and carbon monoxide contained in the inflowing exhaust gas to be reduced as shown in FIG. 6B. In this way, when there is no longer any $NO_2$ present on the surface of the platinum PT, $NO_2$ is successively released from the absorbent. Therefore, if the air-fuel ratio of the inflowing exhaust gas is made rich, the $NO_x$ will be released from the $NO_x$ absorbent 22 in a short time and, further, the released $NO_x$ will be reduced, so no $NO_x$ will be discharged into the atmosphere.

Note that in this case, even if the air-fuel ratio of the inflowing exhaust gas is made the stoichiometric air-fuel ratio, $NO_x$ will be released from the $NO_x$ absorbent 22. When the air-fuel ratio of the inflowing exhaust gas is made the stoichiometric air-fuel ratio, however, the $NO_x$ will be released from the $NO_x$ absorbent 22 only gradually, so a somewhat long time will be required for having all of the $NO_x$ absorbed in the $NO_x$ absorbent 22 be released.

There are, however, limits to the $NO_x$ absorption capability of the $NO_x$ absorbent 22. It is necessary to release the $NO_x$ from the $NO_x$ absorbent 22 before the $NO_x$ absorption capability of the $NO_x$ absorbent 22 becomes saturated. Therefore, it is necessary to estimate the amount of $NO_x$ absorbed in the $NO_x$ absorbent 22. Therefore, in this embodiment of the present invention, the amount of $NO_x$ absorption AX per unit time is found in advance in the form of the map shown in FIG. 7 as a function of the required torque TQ and the engine rotational speed N. The amount $\Sigma NOX$ of $NO_x$ absorbed in the $NO_x$ absorbent 22 is estimated by cumulative addition of the amount of $NO_x$ absorption AX. In this embodiment according to the present invention, when the amount $\Sigma NOX$ of $NO_x$ absorption exceeds a predetermined maximum allowable value, the air-fuel ratio of the inflowing exhaust gas is temporarily made rich so as to make the $NO_x$ be released from the $NO_x$ absorbent 22.

As explained at the start, however, exhaust gas contains $SO_x$ and the $NO_x$ absorbent 22 absorbs not only $NO_x$, but also $SO_x$. The mechanism of absorption of $SO_x$ into the $NO_x$ absorbent 22 is believed to be the same as the mechanism of absorption of $NO_x$.

That is, in the same way as explained with respect to the mechanism of absorption of $NO_x$, giving an explanation taking as an example the case of carrying on the carrier platinum PT and barium Ba, as explained above, when the air-fuel ratio of the inflowing exhaust gas is lean, oxygen $O_2$ deposits on the surface of the platinum Pt in the form of $O_2^-$ or $O^{2-}$. On the other hand, the $SO_2$ in the inflowing exhaust gas reacts with the $O_2^-$ or $O^{2-}$ on the surface of the platinum Pt to become $SO_3$. Next, part of the produced $SO_3$ is oxidized on the platinum Pt and absorbed in the absorbent and diffuses inside the absorbent in the form of sulfate ions $SO_4^{2-}$ while bonding with the barium oxide BaO to produce the stable sulfate $BaSO_4$.

This sulfate $BaSO_4$, however, is stable and hard to decompose. Even if the air-fuel ratio of the inflowing exhaust gas is made rich for release of the $NO_x$ from the $NO_x$ absorbent 22, the sulfate $BaSO_4$ does not decompose and remains as it is. Therefore, along with the passage of time, the sulfate $BaSO_4$ in the $NO_x$ absorbent 22 increases and therefore along with time the amount of $NO_x$ which the $NO_x$ absorbent 22 can absorb falls.

The sulfate $BaSO_4$, however, decomposes when the temperature of the $NO_x$ absorbent 22 exceeds a certain temperature determined by the $NO_x$ absorbent 22, for example, about 600° C. If the air-fuel ratio of the exhaust gas flowing into the $NO_x$ absorbent 22 at this time is made the stoichiometric air-fuel ratio or rich, the $SO_x$ will be released from the $NO_x$ absorbent 22. Making the $SO_x$ be released from the $NO_x$ absorbent 22, however, requires a considerably long time compared with the case of releasing the $NO_x$ from the $NO_x$ absorbent 22. Giving one example, it is possible to release all of the $NO_x$ from the $NO_x$ absorbent 22 by making the air-fuel ratio of the exhaust gas rich for a short time of less than one second, but releasing all of the $SO_x$ from the $NO_x$ absorbent 22 requires the temperature of the $NO_x$ absorbent 22 to be maintained at not less than about 600° C. and the air-fuel ratio of the exhaust gas to be maintained at the stoichiometric air-fuel ratio or rich for about 10 minutes. That is, in order to make all of the $SO_4$ be released from the $NO_x$ absorbent 22, it is necessary to first raise the temperature of the $NO_x$ absorbent 22 to over 600° C. and then keep the air-fuel ratio of the exhaust gas at the stoichiometric air-fuel ratio or rich and maintain the $NO_x$ absorbent 22 at a high temperature.

Since releasing the $SO_x$ from the $NO_x$ absorbent 22 in this way requires first that the temperature of the $NO_x$ absorbent 22 be raised, it is preferable to raise the temperature of the $NO_x$ absorbent 22 as fast as possible. If the temperature of the $NO_x$ absorbent 22 is made to rise too quickly, however, the problem arises of the temperature of the $NO_x$ absorbent 22 rising to an extreme degree and there being the risk of thermal deterioration of the $NO_x$ absorbent 22. That is, there is an optimal required value for the temperature raising rate of the $NO_x$ absorbent 22 and it is necessary to raise the temperature of the $NO_x$ absorbent in accordance with that required value. The required value will be explained in detail later. Before that, the method of raising the temperature of the $NO_x$ absorbent 22 will be explained.

In the present invention, to raise the temperature of the $NO_x$ absorbent 22, use is made of a combination of two methods: the method of raising the temperature of the exhaust gas and the method of increasing the amount of unburned hydrocarbons in the exhaust gas. In this case, in the present invention, the injection timing of the main fuel is delayed so as to raise the temperature of the exhaust gas and auxiliary fuel is injected in addition to the main fuel so as to increase the amount of the unburned hydrocarbons in the exhaust gas. Various injection patterns different in at least one of the amount of retardation of the injection timing of the main fuel and the injection timing of the auxiliary fuel are used.

That is, in this embodiment of the present invention, roughly classified, four injection patterns are used, that is, a first pattern of delaying the injection timing of the main fuel without injecting auxiliary fuel, a second pattern of injecting auxiliary fuel before injecting the main fuel and delaying the injection timing of the main fuel, a third pattern of injecting auxiliary fuel before injecting the main fuel and after injecting the main fuel and delaying the injection timing of the main fuel, and a fourth pattern of injecting auxiliary fuel after injecting the main fuel and delaying the injection timing of the main fuel.

Figure 8:
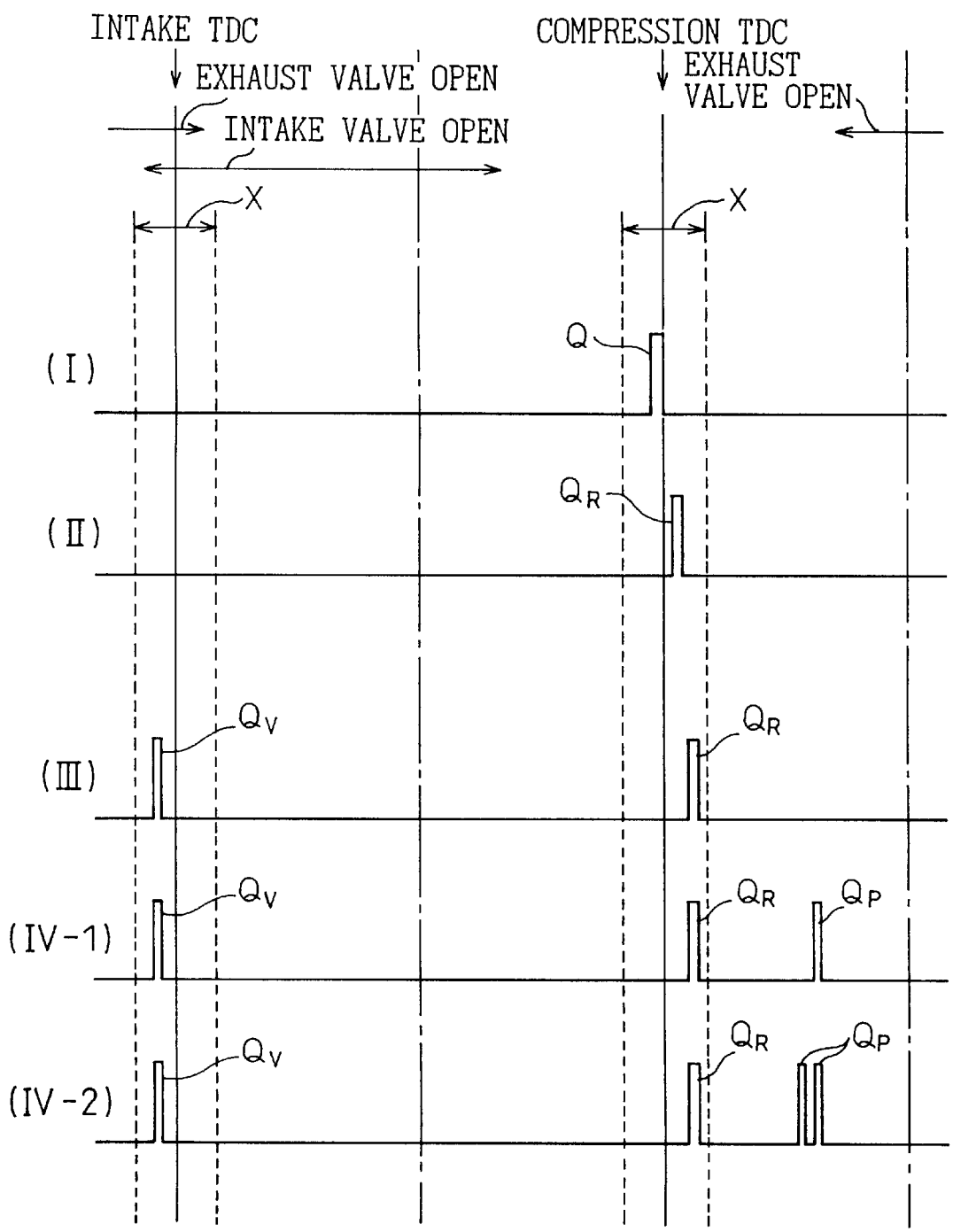
FIGS. 8 to 10 are views of injection timings.
Figure 9:
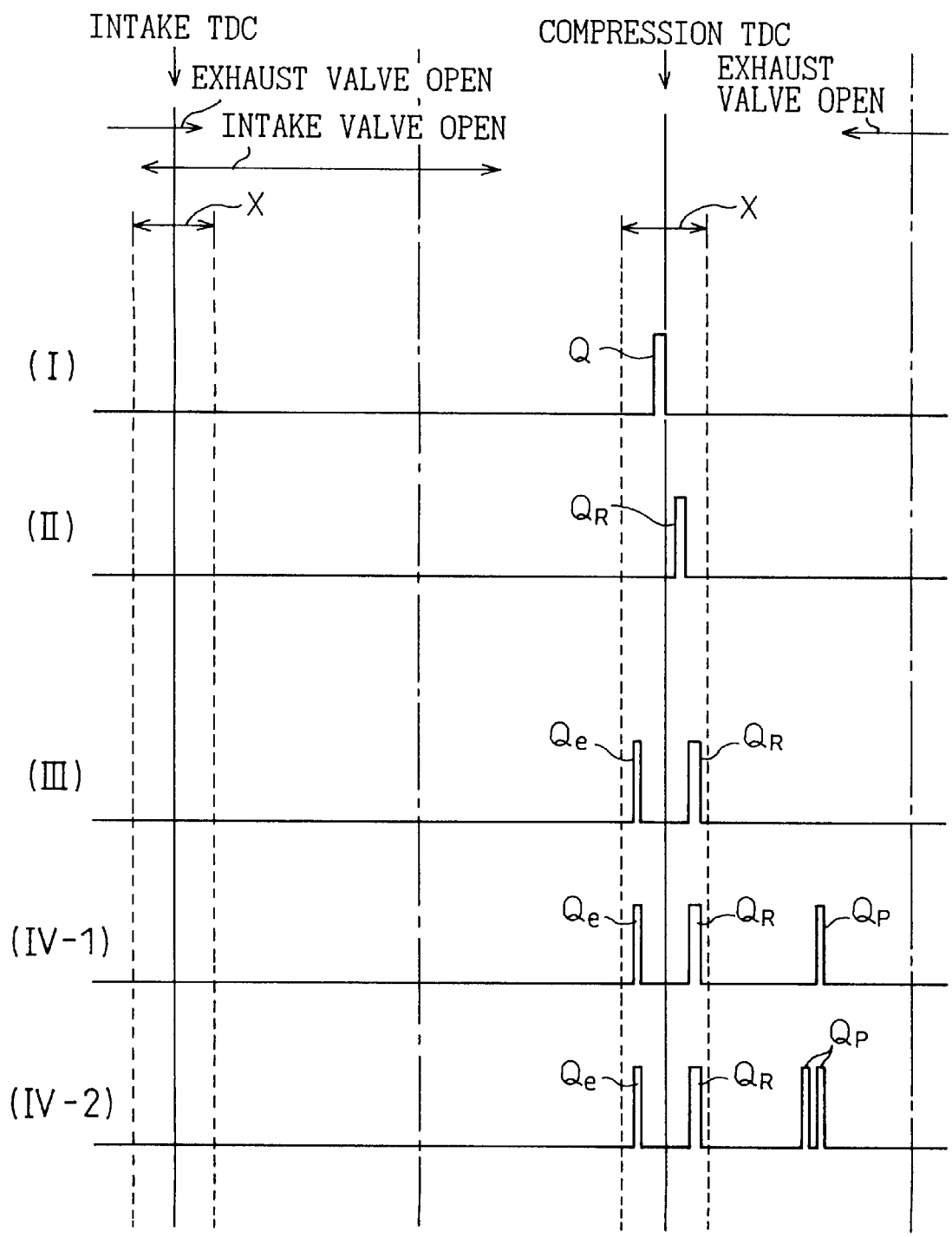
Figure 10:
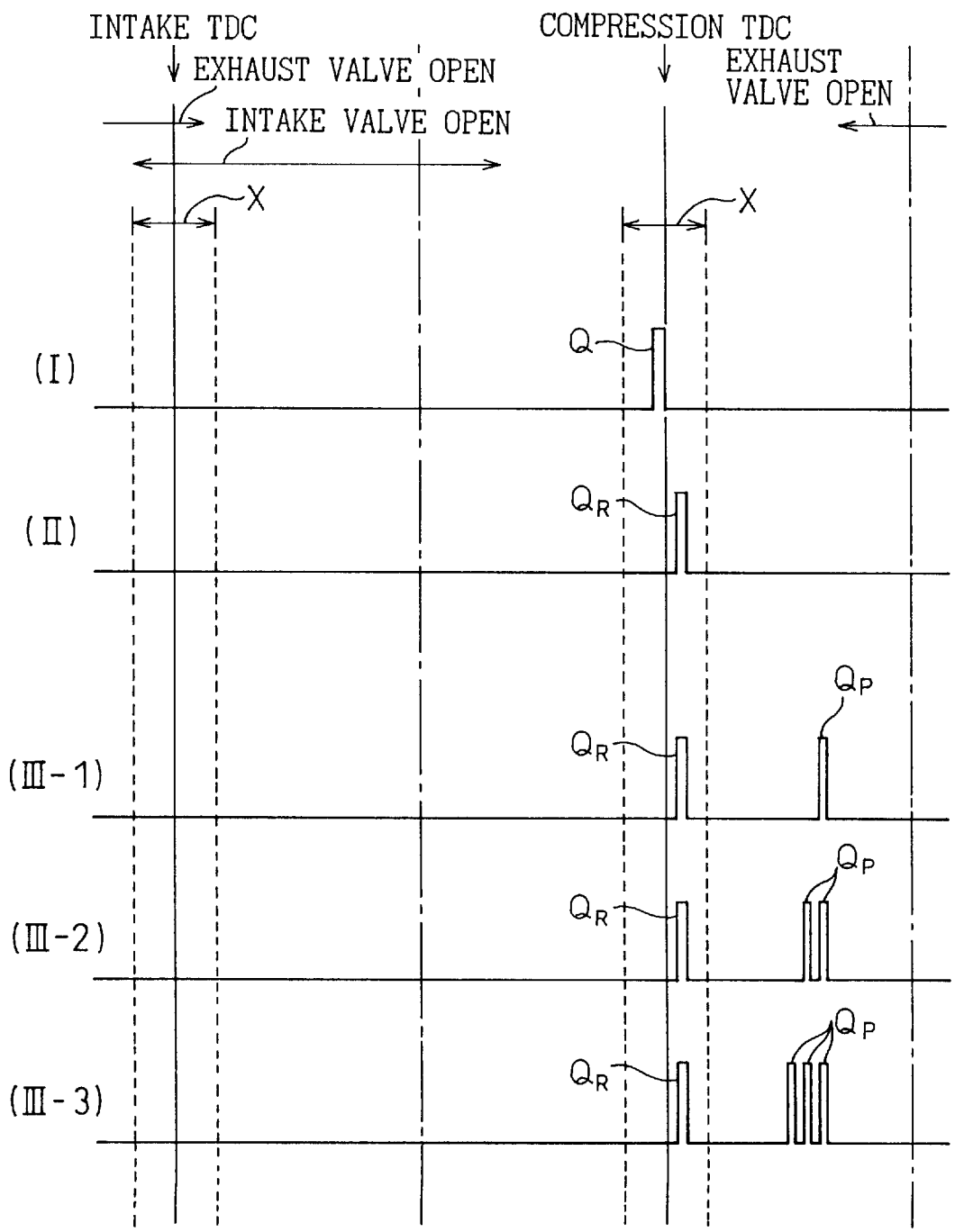
Figure 11:
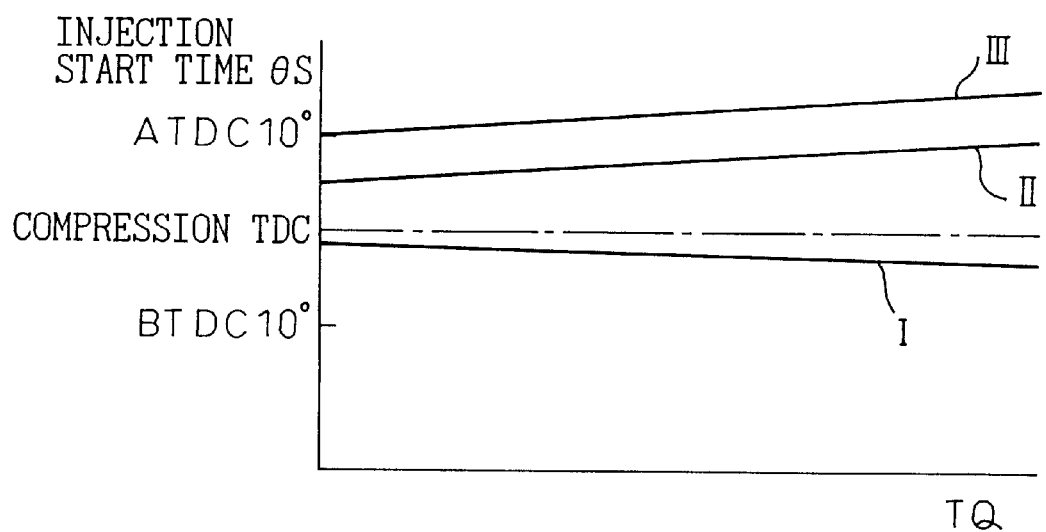
FIG. 11 is a view of an injection start timing.

Next, an explanation will be given of these four injection patterns with reference to FIG. 8 to FIG. 11. FIG. 8 to FIG. 10 show the injection timings of the main fuel and the injection timings of the auxiliary fuel. The abscissas show the crank angle. Further, FIG. 8 to FIG. 10 show the opening timings of the intake valve 7, the opening timings of the exhaust valve 9, and the injection timing X in which fuel injected from a fuel injector 6 can be supplied into a cavity 5a (FIG. 1) formed at the top face of the piston 4. On the other hand, FIG. 11 shows the injection start timing θS of the main fuel. The abscissa in FIG. 11 shows the required torque TQ.

In FIG. 8 to FIG. 10, (I) shows the injection timing at the time of ordinary operation. As will be understood from FIG. 8, FIG. 9, and FIG. 10, auxiliary fuel is not injected during ordinary operation. Only main fuel Q is injected. The injection start timing θS of the main fuel Q at this time is shown by I in FIG. 11. As will be understood from FIG. 11, the injection start timing θS of the main fuel at this time is made before top dead center of the compression stroke.

On the other hand, (II) shows the first injection pattern. As explained above, in the first injection pattern, only the main fuel $Q_R$ is injected, without injection of the auxiliary fuel. Further, at this time, the injection timing of the main fuel $Q_R$ is delayed compared with the time of ordinary operation. II in FIG. 11 shows the injection start timing θS of the main fuel $Q_R$ at this time. As shown in FIG. 11, the injection start timing θS of the main fuel $Q_R$ at this time is delayed until after top dead center of the compression stroke and is delayed more the higher the required torque TQ.

Once past top dead center of the compression stroke, the pressure in the combustion chamber 5 gradually falls and the temperature in the combustion chamber 5 also gradually falls. Since the pressure in the combustion chamber 5 gradually falls after the top dead center of the compression stroke in this way, if the injection start timing θS of the main fuel $Q_R$ is delayed until after top dead center of the compression stroke, the injected fuel will be made to widely diffuse inside the combustion chamber 5 and will be ignited after being widely diffused. That is, the fuel will be burned in a state with sufficient air present around it. As a result, soot will not be produced much. Further, at the time of ignition, the pressure and temperature in the combustion chamber 5 become low, therefore the combustion temperature will not rise that much. Accordingly, not that much $NO_x$ will be produced either.

On the other hand, if the injection start timing θS of the main fuel $Q_R$ is delayed in this way, the combustion time will become longer and therefore the temperature of the exhaust gas will rise. If the temperature of the exhaust gas rises, the temperature of the exhaust gas after-treatment device 21, in the embodiment shown in FIG. 1, the temperature of the $NO_x$ absorbent 22, will be made to rise. In this case, the more the injection start timing θS of the main fuel $Q_R$ is delayed, the higher the temperature of the exhaust gas and therefore, from the viewpoint of raising the temperature of the $NO_x$ absorbent 22, it is preferable to delay the injection start timing θS of the main fuel $Q_R$ as much as possible. If the injection start timing θS of the main fuel QR is delayed too much, however, misfires will occur. Therefore, in the first injection pattern, the injection start timing θS of the main fuel $Q_R$ is set to a timing as much delayed as possible while still in a range where no misfires occur.

(III) in FIG. 8 shows a first example of the second injection pattern. In this example, auxiliary fuel $Q_v$ is injected near top dead center of the suction stroke. Compared with the case of the first injection pattern shown by (II) in FIG. 8, the injection start timing θS of the main fuel $Q_R$ is further delayed. The III of FIG. 11 shows the injection start timing θS of the main fuel at this time. As shown in FIG. 11, the injection start timing θS of the main fuel $Q_R$ at this time is delayed further from the case of the first injection pattern shown by (II) in FIG. 11. Further, at this time as well, the injection start timing θS of the main fuel $Q_R$ is delayed more the higher the required torque TQ.

In the vicinity of the top dead center of the suction stroke, almost no suction air has been fed into the combustion chamber 5 and, thus, the unburned gas is maintained at a high temperature. Accordingly, if the auxiliary fuel $Q_v$ is injected rear top dead center of the suction stroke, the auxiliary fuel $Q_v$ is instantaneously vaporized. If the auxiliary fuel $Q_v$ is vaporized, the heat of compression during the compression stroke causes the production of aldehydes, ketones, peroxides, carbon monoxide, and other intermediate products from the auxiliary fuel $Q_v$. These intermediate products cause the reaction of the main fuel $Q_R$ to be accelerated. Therefore, in this case, even if the injection start timing θS of the main fuel $Q_R$ is delayed by a large extent, good combustion can be obtained without causing misfires. On the other hand, since the injection start timing θS of the main fuel $Q_R$ can be delayed by a large extent in this way, the temperature of the exhaust gas becomes considerably high and therefore the temperature of the $NO_x$ absorbent 22 can be raised to a higher level.

Further, in the example shown by (III) in FIG. 8, when the exhaust valve 9 opens, auxiliary fuel $Q_v$ is injected, so part of the auxiliary fuel $Q_v$ is exhausted into the exhaust port 10 in the form of unburned hydrocarbons. The unburned hydrocarbons, if reaching the $NO_x$ absorbent 22, are oxidized by the excess oxygen in the exhaust gas. The heat of the oxidation reaction occurring at this time causes the temperature of the $NO_x$ absorbent 22 to rise rapidly to a further higher level. That is, in this example, the dual actions of the action of raising the temperature of the exhaust gas and the action of increasing the unburned hydrocarbons in the exhaust gas result in the temperature of the $NO_x$ absorbent 22 being raised.

Further, in the example shown by (III) in FIG. 8, auxiliary fuel $Q_v$ is injected at the injection timing X where the injected fuel is supplied into the cavity 5a of the piston 4. Therefore, it is possible to prevent the auxiliary fuel $Q_v$ from depositing on the inner wall of the cylinder bore. As a result, it is possible to prevent the lubrication oil from being diluted by the injected fuel.

(III) in FIG. 9 shows a second example of the second injection pattern. In this second example, the auxiliary fuel $Q_e$ is injected at the end of the compression stroke. Compared with the case of the first pattern shown by (II) in FIG. 9, the injection start timing θS of the main fuel $Q_R$ is further delayed. The injection start timing θS of the main fuel $Q_R$ at this time is shown by III in FIG. 11. In this case as well, aldehydes, ketones, peroxides, carbon monoxide, and other intermediate products are produced from the auxiliary fuel $Q_e$ and these intermediate products cause the reaction of the main fuel $Q_R$ to be accelerated. Therefore, in this case as well, even if the injection start timing θS of the main fuel $Q_R$ is delayed by a large extent, good combustion can be secured without causing misfires.

In the second example as well, since the auxiliary fuel $Q_e$ is injected at the injection timing X where the injected fuel is supplied into the cavity 5a of the piston 4, it is possible to prevent the auxiliary fuel $Q_e$ from depositing on the inner wall of the cylinder bore.

Note that in the second example, unlike the first example shown by (III) in FIG. 8, fuel is not injected to positively increase the amount of unburned hydrocarbons in the exhaust gas. That is, the second example is aimed at raising the temperature of the exhaust gas by delaying the injection start timing θS of the main fuel $Q_R$ further from the case of the first injection pattern shown by (II) in FIG. 9. Therefore, compared with the case of the first injection pattern shown by (II) in FIG. 9, the second example has a more powerful action of raising the temperature of the $NO_x$ absorbent 22, but compared with the first example, the second example has a weaker action of raising the temperature of the $NO_x$ absorbent 22.

(IV-1) and (IV-2) in FIG. 8 show a first example of the third injection pattern. In the first example, the auxiliary fuel $Q_v$ and main fuel $Q_R$ are injected at the same timings as the second injection pattern shown by (III) in FIG. 8 and auxiliary fuel $Q_p$ is further injected during the expansion stroke or exhaust stroke after injection of the main fuel $Q_R$. In the example shown in FIG. 8, the auxiliary fuel $Q_p$ is injected during the expansion stroke just before the exhaust valve 9 opens.

The auxiliary fuel $Q_p$ is not burned in the combustion chamber 5, therefore if the auxiliary fuel $Q_p$ is injected, the auxiliary fuel $Q_p$ is exhausted into the exhaust port 10 in the form of unburned hydrocarbons. Therefore, if the auxiliary fuel $Q_p$ is injected, the amount of unburned hydrocarbons in the exhaust gas is increased and therefore the heat of oxidation reaction of the unburned hydrocarbons causes the temperature of the $NO_x$ absorbent 22 to rapidly rise. Compared with the case of making the temperature of the exhaust gas rise to raise the temperature of the $NO_x$ absorbent 22, increasing the amount of unburned hydrocarbons in the exhaust gas and using the heat of oxidation reaction to raise the temperature of the $NO_x$ absorbent 22 enables the temperature of the $NO_x$ absorbent 22 to be raised far more rapidly, so compared with the case of using the second injection pattern shown by (III) in FIG. 8, use of the third injection pattern shown by (IV-1) and (IV-2) in FIG. 8 enables the temperature of the $NO_x$ absorbent 22 to be raised far more rapidly. The auxiliary fuel $Q_p$, however, does not contribute to the production of output in the engine, so if the auxiliary fuel $Q_p$ is injected, the amount of fuel consumption is increased.

When making the temperature of the $NO_x$ absorbent 22 rise more rapidly, as shown by (IV-2) in FIG. 8, the number of injections of the auxiliary fuel $Q_p$ may be increased. That is, if injecting a large amount of auxiliary fuel $Q_p$ the penetration force of the injected fuel becomes greater, so part of the auxiliary fuel $Q_p$ ends up depositing on the inner wall of the cylinder bore. As opposed to this, if the amount of injection of the auxiliary fuel $Q_p$ is reduced, the penetration force of the injected fuel becomes smaller, so the auxiliary fuel $Q_p$ will no longer deposit on the inner wall of the cylinder bore. Therefore, when increasing the amount of injection of the auxiliary fuel $Q_p$, as shown by (IV-2) in FIG. 8, small amounts of the auxiliary fuel $Q_p$ are injected at intervals over several times.

(IV-1) and (IV-2) of FIG. 9 show a second example of the third injection pattern. In the second example, the auxiliary fuel $Q_e$ and the main fuel $Q_R$ are injected at the same timings as the second injection pattern shown by (III) in FIG. 9 and further auxiliary fuel $Q_s$ is injected during the expansion stroke or exhaust stroke after the injection of the main fuel $Q_R$. In the example shown in FIG. 9, the auxiliary fuel $Q_p$ is injected during the expansion stroke right before the exhaust valve 9 opens.

In the second example as well, when making the temperature of the $NO_x$ absorbent 22 rise more rapidly, as shown by (IV-2) in FIG. 9, the number of injections of the auxiliary fuel $Q_p$ may be increased.

(III-1), (III-2), and (III-3) of FIG. 10 show the fourth injection pattern. In this fourth injection pattern, the main fuel $Q_R$ is injected at the same timing as the first injection pattern shown by (II) of FIG. 10 and further auxiliary fuel $Q_p$ is injected during the expansion stroke or exhaust stroke after injection of the main fuel QR. In the example shown in FIG. 10, the auxiliary fuel $Q_p$ is injected during the expansion stroke right before the exhaust valve 9 opens.

In the fourth injection pattern as well, when making the temperature of the $NO_x$ absorbent 22 rise more rapidly, as shown by (III-2) and (III-3) in FIG. 10, the number of injections of the auxiliary fuel $Q_p$ may be increased.

If the injection pattern is changed in this way, one or both of the temperature of the exhaust gas or the amount of the unburned hydrocarbons in the exhaust gas change, therefore the rate of rise of the temperature of the $NO_x$ absorbent 22 changes. Further, even with the same injection pattern, if the number of injections of the auxiliary fuel $Q_p$ after top dead center of the compression stroke is changed, the amount of unburned hydrocarbons in the exhaust gas changes and therefore the rate of rise of the temperature of the $NO_x$ absorbent 22 changes. Accordingly, by changing the injection pattern or changing the number of injections of the auxiliary fuel $Q_p$ after top dead center of the compression stroke, it is possible to control the temperature raising rate of the $NO_x$ absorbent 22 to the optimal rate.

Next, as one example, an explanation will be given of the case of using the first injection pattern shown by (II) in FIG. 8, the second injection pattern shown by (III) in FIG. 8, and the third injection pattern shown by (IV-1) and (IV-2) in FIG. 8 when raising the temperature of the $NO_x$ absorbent 22 to the target temperature, for example, 650° C.

Figure 12:
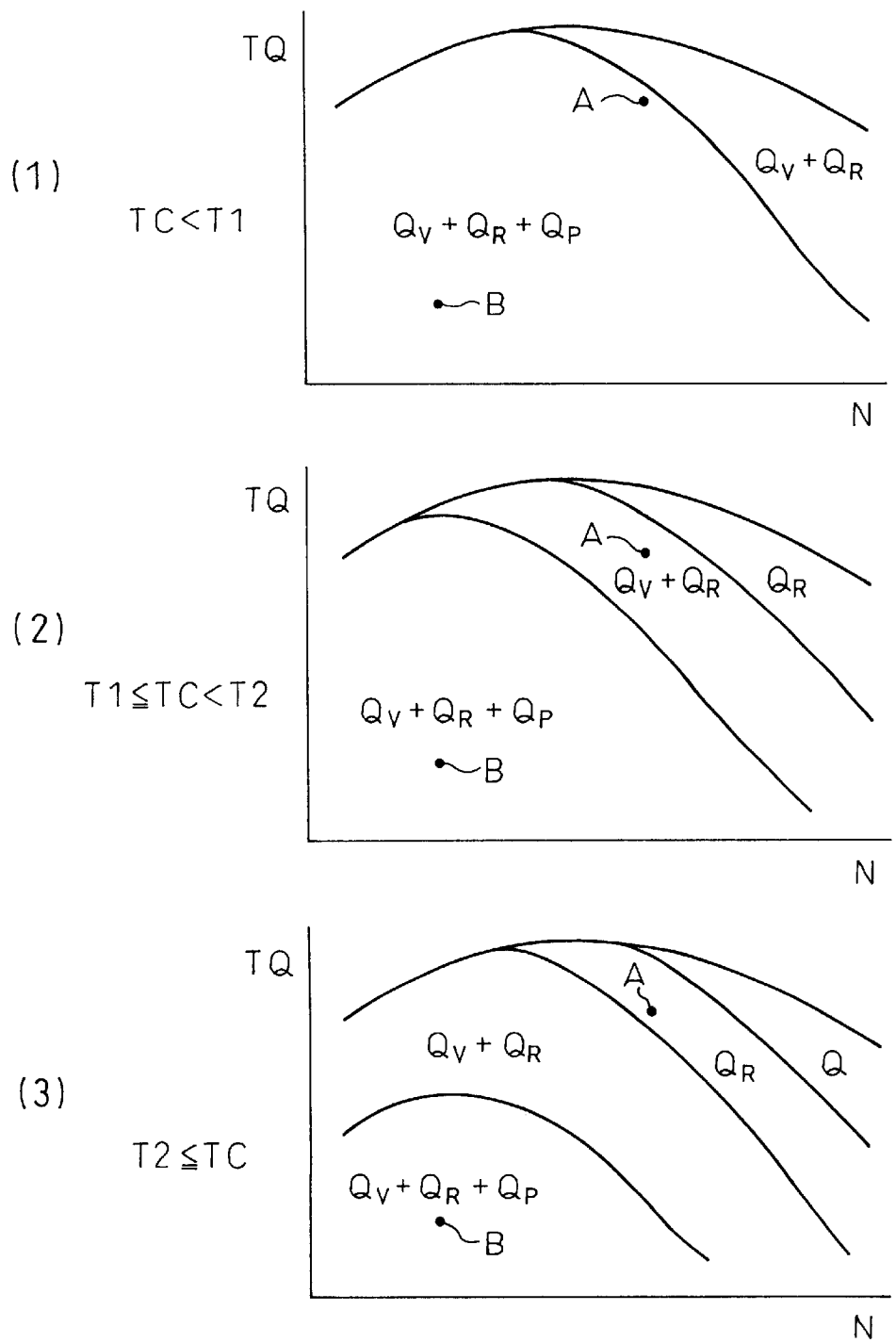
FIG. 12 is a view of injection patterns.

FIG. 12 shows the relationship between the injection pattern used when raising the temperature of the $NO_x$ absorbent 22, the required torque TQ, and the engine rotational speed N. That is, the region shown by Q in FIG. 12 shows the operating region where the injection Q of ordinary operation shown by (I) in FIG. 8 is performed, the region shown by $Q_R$ shows the operating region where injection is performed by the first injection pattern $Q_R$ shown by (II) in FIG. 8, the region shown by $Q_v+Q_R$ shows the operating region where injection is performed by the second injection pattern $Q_v+Q_R$ shown by (III) in FIG. 8, and the region shown by $Q_v+Q_R+Q_p$ shows the operating region where injection is performed by the third injection pattern $Q_v+Q_R+Q_p$ shown by (IV-1) or (IV-2) in FIG. 8.

Further, (1) in FIG. 12 shows when the temperature TC of the exhaust gas after-treatment device 21, in this embodiment, the temperature TC of the $NO_x$ absorbent 22, is lower than a predetermined first temperature T1, for example 300° C., (2) in FIG. 12 shows when the temperature TC of the $NO_x$ absorbent 22 is higher than the first temperature T1 and lower than a predetermined second temperature T2, for example, 500° C., and (3) in FIG. 12 shows when the temperature TC of the $NO_x$ absorbent 22 is higher than the second temperature T2.

When the temperature TC of the $NO_x$ absorbent 22 is lower than the first temperature T1 as shown by (1) in FIG. 12, injection is performed by the second injection pattern $Q_v+Q_R$ in only the limited operating region where the required torque TQ is high and the engine rotational speed N is high, while injection is performed by the third injection pattern $Q_v+Q_R+Q_p$ in the greater portion of the other operating region.

On the other hand, when the temperature TC of the $NO_x$ absorbent 22 is T1≦TC<T2, as shown by (2) in FIG. 12, injection is performed by the first injection pattern $Q_R$ in the limited operating region where the required torque TQ is high and the engine rotational speed N is high, injection is performed by the second injection pattern $Q_v+Q_R$ in the operating region at the low load side of this operating region, and injection is performed by the third injection pattern $Q_v+Q_R+Q_p$ in the operating region at the further lower load side of this operating region.

On the other hand, when the temperature TC of the $NO_x$ absorbent 22 is T2≦TC, as shown by (3) in FIG. 12, injection of an ordinary operation is performed in the limited operating region where the required torque TQ is high and the engine rotational speed N is high, injection is performed by the first injection pattern $Q_R$ in the operating region at the low load side of this operating region, injection is performed by the second injection pattern $Q_v+Q_R$ in the operating region at the further lower load side of this operating region, and injection is performed by the third injection pattern $Q_v+Q_R+Q_p$ in the operating region at the further lower load side of this operating region.

That is, as the temperature TC of the $NO_x$ absorbent 22 becomes higher, the operating region where injection is performed by the first injection pattern $Q_R$ and the operating region where injection is performed by the second injection pattern $Q_v+Q_R$ shift to the low load side.

Figure 13A:
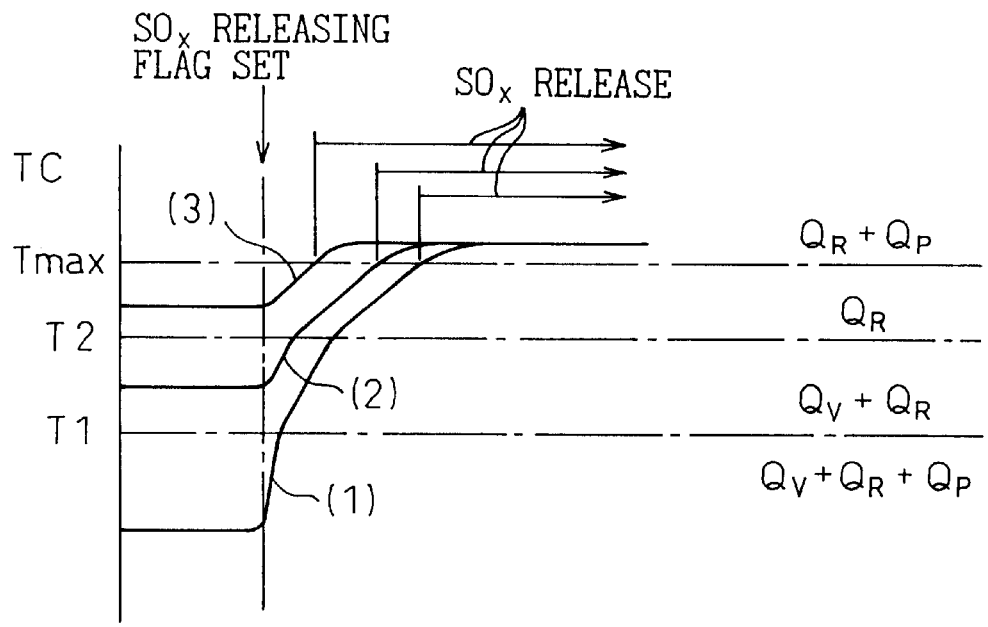
FIGS. 13A and 13B are time charts of temperature changes of an $NO_x$ absorbent.

FIG. 13A shows the change in the temperature TC of the $NO_x$ absorbent 22 and the change in the injection pattern when assuming the action of raising the temperature of the $NO_x$ absorbent 22 is started and the same required torque TQ and engine rotational speed N are maintained after that as well in the case of the required torque TQ and the engine rotational speed N shown by the point A in FIG. 12. Note that the solid line (1) in FIG. 13A, shows the case where the action of raising the temperature of the $NO_x$ absorbent 22 was started when TC<T1 as shown by (1) in FIG. 12, the solid line (2) in FIG. 13A shows the case where the action of raising the temperature of the $NO_x$ absorbent 22 was started when T1≦TC<T2 as shown by (2) in FIG. 12, and the solid line (3) in FIG. 13A shows the case where the action of raising the temperature of the $NO_x$ absorbent 22 was started when T2≦TC as shown by (3) in FIG. 12.

Further, in FIG. 13A, the action of raising the temperature of the $NO_x$ absorbent 22 is started when an $SO_x$ releasing flag showing that $SO_x$ should be released from the $NO_x$ absorbent 22 is set. The action of releasing the $SO_x$ from the $NO_x$ absorbent 22 is started when the temperature TC of the $NO_x$ absorbent 22 passes a target temperature $T_{max}$ where the $SO_x$ can be released.

If the action of raising the temperature of the $NO_x$ absorbent 22 is started when TC<TL, first injection is performed by the third injection pattern $Q_v+Q_R+Q_p$, then when TC≧T1, injection is performed by the second injection pattern $Q_v+Q_R$, then, when TC≧T2, injection is performed by the first injection pattern $Q_R$. In this case, the temperature raising rate of the $NO_x$ absorbent 22 due to the third injection pattern $Q_v+Q_R+Q_p$ is the highest, the temperature raising rate of the $NO_x$ absorbent 22 due to the second injection pattern $Q_v+Q_R$ is the next highest, and the temperature raising rate of the $NO_x$ absorbent 22 due to the first injection pattern $Q_R$ is the lowest.

Therefore, if the action of raising the temperature of the $NO_x$ absorbent 22 is started when. TC<T1, as shown by the solid line (1) of FIG. 13A, the temperature TC of the $NO_x$ absorbent 22 rapidly rises, then, when the temperature TC of the $NO_x$ absorbent 22 passes T1, the temperature raising rate of the $NO_x$ absorbent 22 falls a bit, then, when the temperature TC of the $NO_x$ absorbent 22 passes T2, the temperature raising rate of the $NO_x$ absorbent 22 becomes further lower.

On the other hand, if the action of raising the temperature of the $NO_x$ absorbent 22 is started when T1≦TC<T2, first, injection is performed by the second injection pattern $Q_v+Q_R$, then, when TC≧T2, injection is performed by the first injection pattern $Q_R$. Therefore, at this time, as shown by the solid line (2) in FIG. 13A, first the temperature TC of the $NO_x$ absorbent 22 rises relatively slowly, then, when the temperature TC of the $NO_x$ absorbent 22 passes T2, the temperature raising rate of the $NO_x$ absorbent 22 becomes lower.

On the other hand, if the action of raising the temperature of the $NO_x$ absorbent 22 is started when T2≦TC, injection is performed by the first injection pattern $Q_R$, therefore, at this time, as shown by the solid line (3) in FIG. 13A, the temperature TC of the $NO_x$ absorbent 22 slowly rises.

Figure 13B:
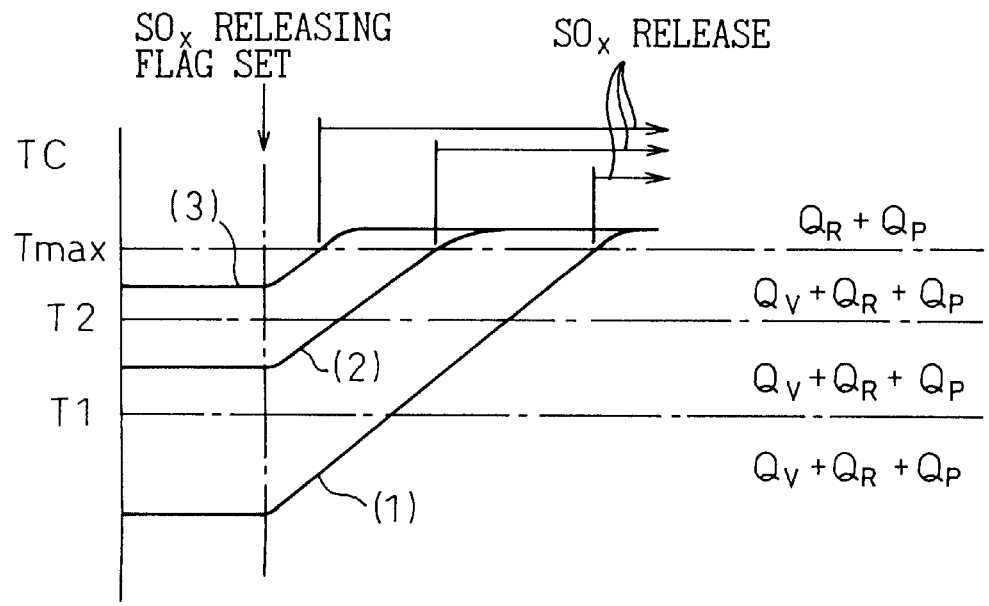

FIG. 13B shows the change in the temperature TC of the $NO_x$ absorbent 22 and the change in the injection pattern when assuming the action of raising the temperature of the $NO_x$ absorbent 22 is started and the same required torque TQ and engine rotational speed N are maintained after that as well in the case of the required torque TQ and the engine rotational speed N shown by the point B in FIG. 12. Note that the solid line (1) in FIG. 13B shows the case where the action of raising the temperature of the $NO_x$ absorbent 22 was started when TC<TL as shown by (1) in FIG. 12, the solid line (2) in FIG. 13B shows the case where the action of raising the temperature of the $NO_x$ absorbent 22 was started when T1≦TC<T2 as shown by (2) in FIG. 12, and the solid line (3) in FIG. 13B shows the case where the action of raising the temperature of the $NO_x$ absorbent 22 was started when T2≦TC as shown by (3) in FIG. 12.

When maintaining the required torque TQ and the engine rotational speed N shown by the point B in FIG. 12, as will be understood from FIG. 12, whether TC<T1, T1≦TC<T2, or T2≦TC, injection is performed by the third injection pattern $Q_v+Q_R+Q_p$, therefore as shown by the solid lines (1), (2), and (3). in FIG. 13B, the temperature raising rate of the $NO_x$ absorbent 22 becomes about the same regardless of the temperature TC of the $NO_x$ absorbent 22.

That is, as shown by the solid line (1) of FIG. 13A, if the action of raising the temperature of the $NO_x$ absorbent 22 is started when TC<T1, that is, if the action of raising the temperature of the $NO_x$ absorbent 22 is started when there is a large difference between the temperature TC of the $NO_x$ absorbent 22 and the target temperature $T_{max}$, injection is performed by the third injection pattern $Q_v+Q_R+Q_p$ so as to raise the temperature TC of the $NO_x$ absorbent 22 to the target temperature $T_{max}$ as fast as possible. When performing injection by this third injection pattern $Q_v+Q_R+Q_p$, however, the temperature TC of the $NO_x$ absorbent 22 will rapidly rise, so it will be difficult to control the temperature TC of the $NO_x$ absorbent 22 and consequently if just this third injection pattern $Q_v+Q_R+Q_p$ is used, the temperature TC of the $NO_x$ absorbent 22 will end up greatly exceeding the target temperature $T_{max}$ and therefore there will be the risk of thermal deterioration of the $NO_x$ absorbent 22. Further, if the third injection pattern $Q_v+Q_R+Q_p$ continues to be used, the amount of fuel consumption will increase.

Therefore, when TC≧T1, in order to prevent thermal deterioration of the $NO_x$ absorbent 22 and reduce the amount of fuel consumption, the third injection pattern $Q_v+Q_R+Q_p$ is switched to the second injection pattern $Q_v+Q_R$, then, when the temperature TC of the $NO_x$ absorbent 22 approaches the target temperature $T_{max}$, that is, when TC≧T2, the second injection pattern $Q_v+Q_R$ is switched to the first injection pattern $Q_R$. If the first injection pattern $Q_R$ is used, the temperature raising rate of the $NO_x$ absorbent 22 becomes smaller and therefore the control of the temperature TC of the $NO_x$ absorbent 22 becomes easy. Accordingly, it is possible to prevent thermal deterioration of the $NO_x$ absorbent 22 and possible to reduce the amount of fuel consumption.

Further, in the case shown by the solid line (2) in FIG. 13A, the temperature TC of the $NO_x$ absorbent 22 is first made to rise relatively quickly, then to prevent thermal deterioration of the $NO_x$ absorbent 22 and reduce the amount of fuel consumption, the second injection pattern $Q_v+Q_R$ is switched to the first injection pattern $Q_R$. Further, as shown by the solid line (3) in FIG. 13A, when the action of raising the temperature of the $NO_x$ absorbent 22 is started when TC≧T2, injection is performed by the first injection pattern $Q_R$ from the start so as to prevent thermal deterioration of the $NO_x$ absorbent 22 and reduce the amount of fuel consumption.

On the other hand, when the required torque TQ is low as shown by the point B in FIG. 12, the amount of fuel injection is small and therefore even if the injection timing of the main fuel is delayed, the temperature of the exhaust gas will not become that high. Therefore, at this time, to make the temperature of the $NO_x$ absorbent 22 rise as fast as possible, injection is performed by the third injection pattern $Q_v+Q_R+Q_p$ regardless of the temperature TC of the $NO_x$ absorbent 22. When the temperature of the exhaust gas is not that high in this way, however, even if injection is performed by the third injection pattern $Q_v+Q_R+Q_p$, as shown by the solid lines (1), (2), and (3) of FIG. 13B, the temperature raising rate of the $NO_x$ absorbent 22 will not become that high. Therefore, at this time, even if injection is performed by the third injection pattern $Q_v+Q_R+Q_p$, the temperature TC of the $NO_x$ absorbent 22 can be easily controlled and consequently there is no risk of the temperature TC of the $NO_x$ absorbent 22 become extremely high and of thermal deterioration of the $NO_x$ absorbent 22.

In this way, in this embodiment of the present invention, when raising the temperature TC of the $NO_x$ absorbent 22, the optimal injection pattern for the temperature TC of the $NO_x$ absorbent 22, the required torque TQ, and the engine rotational speed N is used. Note that the injection patterns shown in FIG. 12 are just examples and it is possible to use a fourth injection pattern $Q_R+Q_p$ in accordance with need.

In FIGS. 13A and 13B, when the temperature TC of the $NO_x$ absorbent 22 exceed a target temperature $T_{max}$ of 600° C. to 700° C., control is performed to release the $SO_x$ from the $NO_x$ absorbent 22. Next, an explanation will be given of the control for release of the $SO_x$ with reference to FIG. 14.

Figure 14:
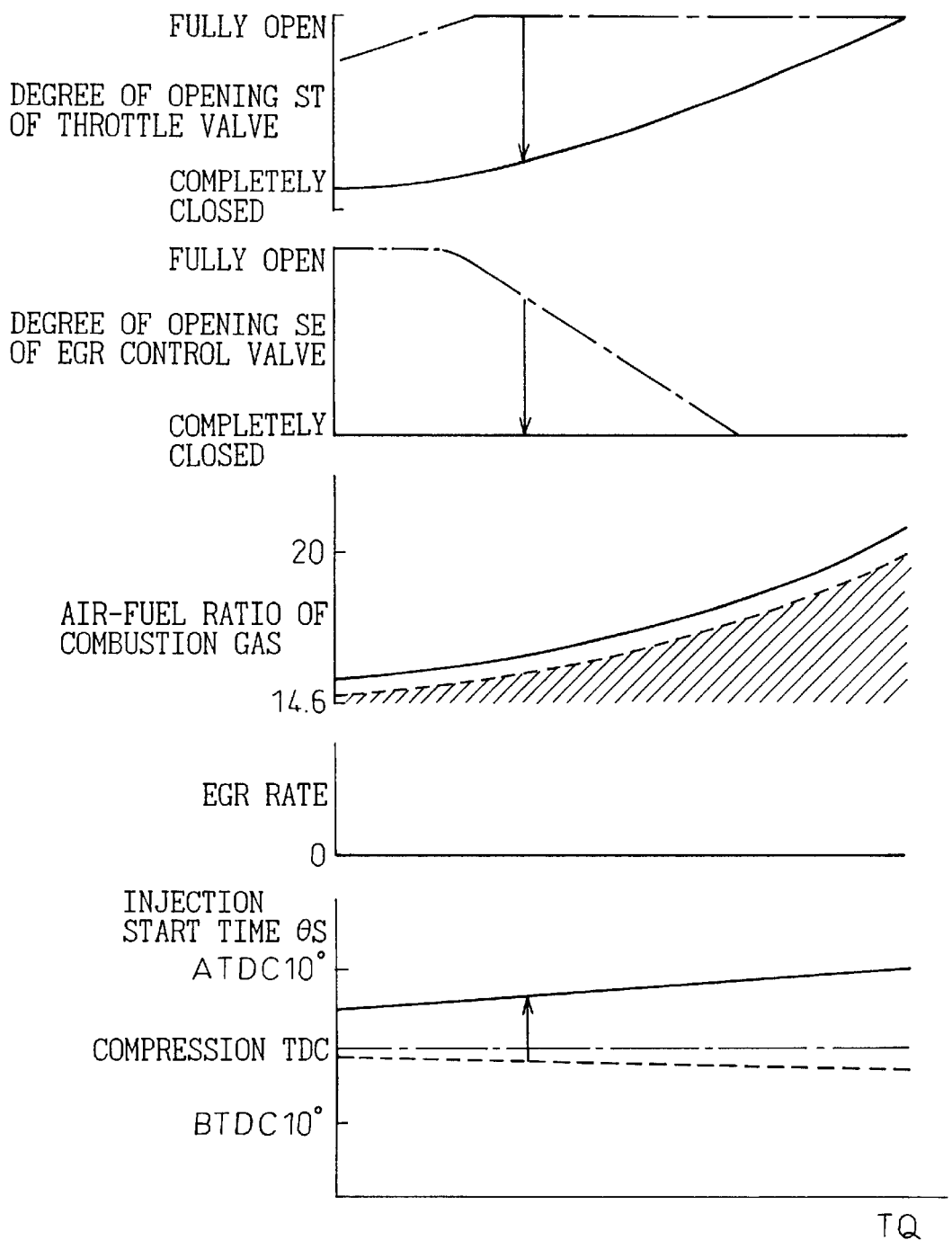
FIG. 14 is a view of changes in the throttle valve degree of opening etc. at the time of control for release of $SO_x$.

FIG. 14 shows the degree of opening ST of the throttle valve 17, the degree of opening SE of the EGR control valve 25, the air-fuel ratio of the combustion gas of the main fuel in the combustion chamber 5, the EGR rate, and the injection start timing θS of the main fuel when releasing $SO_x$ from the $NO_x$ absorbent 22. Note that in the degree of opening ST of the throttle valve 17 and the degree of opening SE of the EGR control valve 25 of FIG. 14, the dash-dot lines show the degrees of opening at the time of ordinary operation shown in FIG. 3 and the solid lines shown the degrees of opening at the time of release of $SO_x$. Further, in the air-fuel ratio of the combustion gas, the broken line shows the limit of production of smoke. Smoke is produced in the hatched region. Further, in the injection start timing θS of the main fuel, the broken line shows the timing at the time of ordinary operation and the solid line shows the timing at the time of release of $SO_x$.

As shown in FIG. 14, when $SO_x$ is to be released from the $NO_x$ absorbent 22, the EGR control valve 25 is completely closed, therefore the EGR rate becomes zero. Further, the injection start timing θS of the main fuel is delayed to after the top dead center of the compression stroke. At this time, the degree of opening ST of the throttle valve 17 is reduced so that the air-fuel ratio of the combustion gas of the main fuel becomes the target air-fuel ratio shown by the solid line slightly larger than the smoke limit. The target air-fuel ratio of the combustion gas shown by the solid line becomes smaller the lower the required torque TQ, therefore the degree of opening ST of the throttle valve 17 becomes smaller the lower the required torque TQ.

Figure 15:
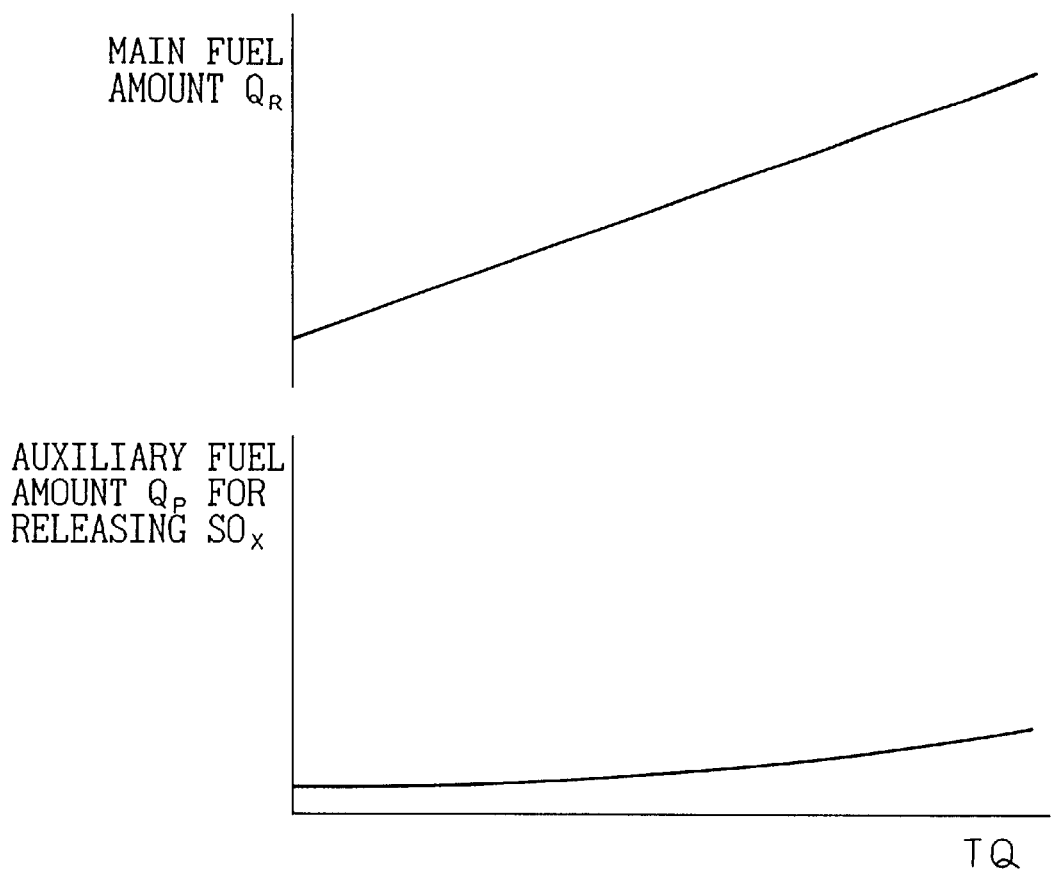
FIG. 15 is a view of the amounts of main fuel and auxiliary fuel.

Further, when $SO_x$ is to be released from the $NO_x$ absorbent 22, the auxiliary fuel $Q_p$ is injected during the expansion stroke or exhaust stroke so that the air-fuel ratio of the exhaust gas flowing into the $NO_x$ absorbent 22 becomes the stoichiometric air-fuel ratio or rich. In this embodiment of the present invention, auxiliary fuel $Q_p$ is injected during the expansion stroke right before the exhaust valve 9 opens so that the exhaust gas flowing into the $NO_x$ absorbent 22 becomes just slightly rich. That is, when $SO_x$ is to be released from the $NO_x$ absorbent 22, injection is performed by the fourth injection pattern $Q_R+Q_p$ shown by (III-1) or (III-2) or (III-3) of FIG. 10. As shown in FIG. 15, when $SO_x$ is to be released from the $NO_x$ absorbent 22, the amount of the auxiliary fuel $Q_p$ increases the higher the required torque TQ.

The degree of opening ST of the throttle valve 17 and the injection start timing θS of the main fuel when $SO_x$ is to be released from the $NO_x$ absorbent 22 are not functions of just the required torque TQ, but are functions of the required torque TQ and the engine rotational speed N. In this embodiment of the present invention, the degree of opening ST of the throttle valve 17 and the injection start timing θS of the main fuel when $SO_x$ is to be released from the $NO_x$ absorbent 22 are stored in advance in the ROM 32 in the form of maps as functions of the required torque TQ and the engine rotational speed N as shown in FIG. 16A and FIG. 16B.

Figure 17:
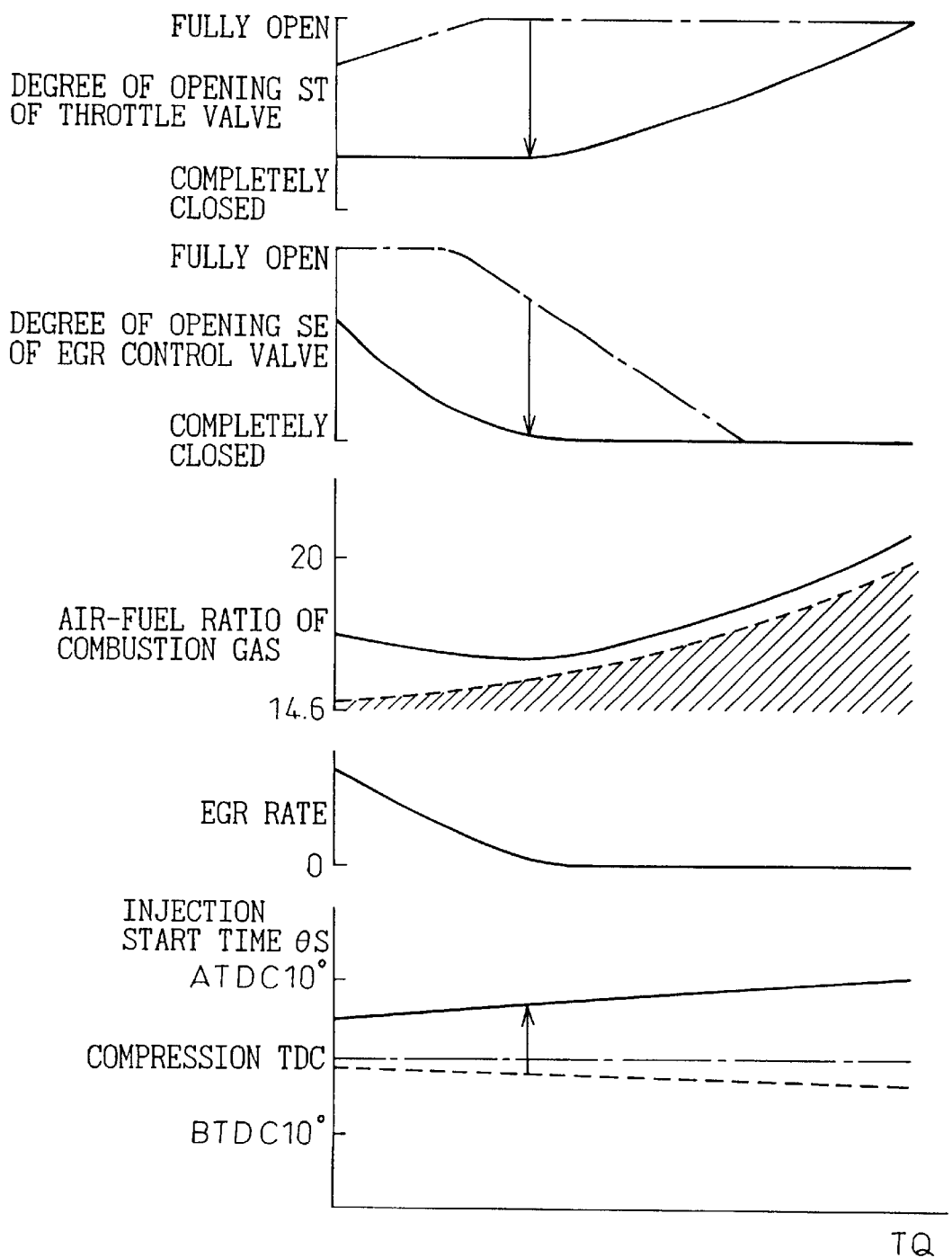
FIG. 17 is a view of changes in the throttle valve degree of opening etc. at the time of control for $SO_x$ release.

FIG. 17 shows another embodiment of the control for release of $SO_x$ from the $NO_x$ absorbent 22. In this embodiment, when the required torque TQ becomes less than a certain torque, the degree of opening ST of the throttle valve 17 is made a fixed degree of opening and the degree of opening SE of the EGR control valve 25 is made larger as the required torque TQ becomes lower.

On the other hand, when $NO_x$ is to be released from the $NO_x$ absorbent 22, there is no particular need to raise the temperature of the $NO_x$ absorbent 22. At this time, it is sufficient to make the air-fuel ratio of the exhaust gas flowing into the $NO_x$ absorbent 22 temporarily rich.

Figure 18:
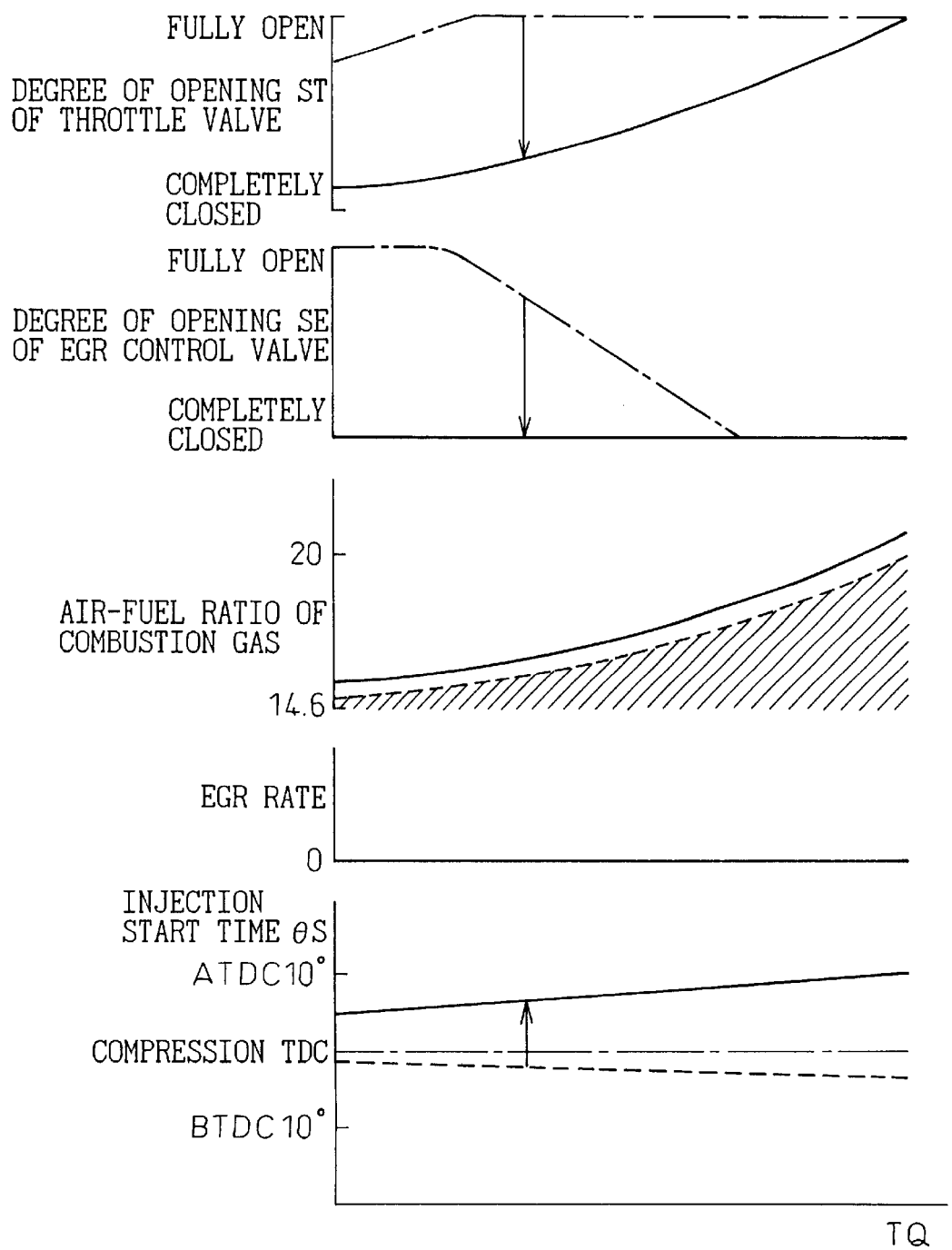
FIG. 18 is a view of changes in the throttle valve degree of opening etc. at the time of control for $NO_x$ release.

FIG. 18 shows the degree of opening ST of the throttle valve 17, the degree of opening SE of the EGR control valve 25, the air-fuel ratio of the combustion gas of the main fuel in the combustion chamber 5, the EGR rate, and the injection start timing θS of the main fuel when $NO_x$ is to be released from the $NO_x$ absorbent 22. Note that in the degree of opening ST of the throttle valve 17 and the degree of opening SE of the EGR control valve 25 in FIG. 18, the chain lines show the degrees of opening at the time of ordinary operation shown in FIG. 3 and the dash-dot lines show the degrees of opening at the time of release of $NO_x$. Further, in the air-fuel ratio of the combustion gas, the broken line shows the limit of production of smoke. Smoke is produced in the hatched region. Further, in the injection start timing θS of the main fuel, the broken line shows the timing at the time of ordinary operation while the solid line shows the timing at the time of release of $NO_x$.

As shown in FIG. 18, when $NO_x$ is to be released from the $NO_x$ absorbent 22, the EGR control valve 25 is completely closed and therefore the EGR rate becomes zero. Further, the injection start timing θS of the main fuel is delayed to after the top dead center of the compression stroke. At this time, the degree of opening ST of the throttle valve 17 is reduced so that the air-fuel ratio of the combustion gas of the main fuel becomes the target air-fuel ratio shown by the solid line slightly larger than the smoke limit. The degree of opening ST of the throttle valve 17 and the injection start timing θS of the main fuel shown in FIG. 18 are the same as the degree of opening ST of the throttle valve and the injection start timing θS of the main fuel at the time of release of $SO_x$ shown in FIG. 14. Therefore, the degree of opening ST of the throttle valve 17 and the injection start timing θS of the main fuel at the time of release of $NO_x$ are calculated from the maps shown by FIG. 16A and FIG. 16B.

Figure 19:
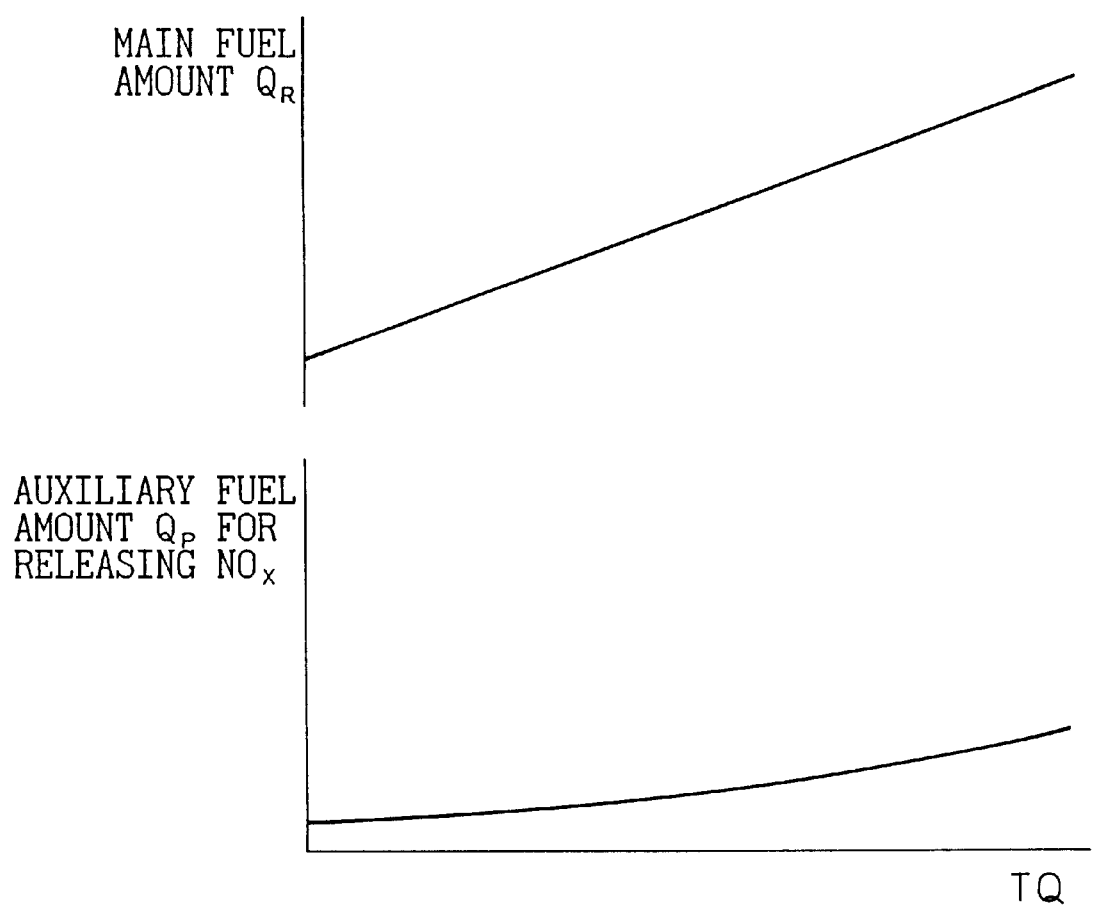
FIG. 19 is a view of the amounts of main fuel and auxiliary fuel.

Further, when $NO_x$ is to be released from the $NO_x$ absorbent 22, auxiliary fuel $Q_p$ is injected during the expansion stroke or exhaust stroke so that the air-fuel ratio of the exhaust gas flowing into the $NO_x$ absorbent becomes rich. In this embodiment of the present invention, auxiliary fuel $Q_p$ is injected during the expansion stroke immediately before the exhaust valve 9 opens so that the exhaust gas flowing into the $NO_x$ absorbent 22 becomes rich. That is, when $NO_x$ is to be released from the $NO_x$ absorbent 22, injection is performed by the fourth injection pattern $Q_R+Q_p$ shown by (III-1), (III-2), or (III-3) in FIG. 10. As shown in FIG. 19, the amount of auxiliary fuel $Q_p$ when $SO_x$ is to be released from the $NO_x$ absorbent 22 increases the higher the required torque TQ.

Next, an explanation will be made of the processing routine for the $NO_x$ releasing flag which is set when $NO_x$ is to be released from the $NO_x$ absorbent 22 and the $SO_x$ releasing flag which is set when $SO_x$ is to be released from the $NO_x$ absorbent 22 while referring to FIG. 20. Note that this routine is executed by interruption every predetermined time interval.

Figure 7:
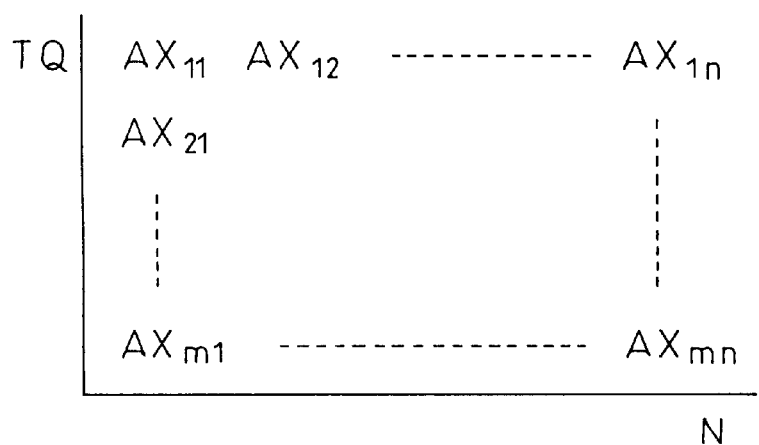
FIG. 7 is a view of a map of an amount of $NO_x$ absorption per unit time.
Figure 20:
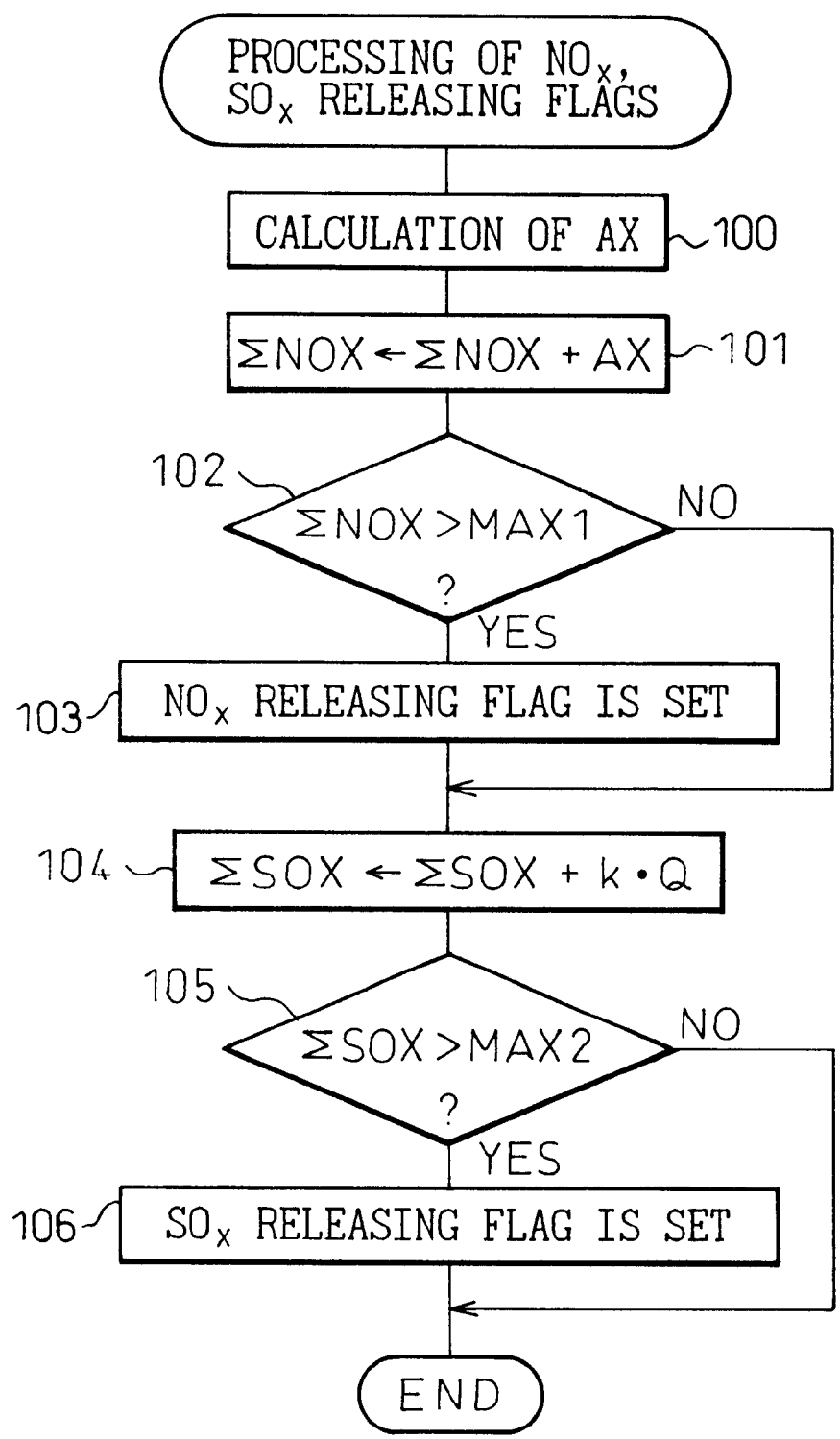
FIG. 20 is a flow chart of the processing of an $NO_x$ releasing flag and $SO_x$ releasing flag.

Referring to FIG. 20, first, at step 100, the amount AX' of absorption of $NO_x$ per unit time is calculated from the map shown in FIG. 7. Next, at step 101, AX is added to the amount ΣNOX of absorption of $NO_x$. Next, at step 102, it is determined if the amount ΣNOX of absorption of $NO_x$ has exceeded a maximum allowable value MAX1. If ΣNOX>MAX1, the routine proceeds to step 103, where the $NO_x$ releasing flag showing that $NO_x$ should be released is set. Next, the routine proceeds to step 104.

At step 104, the product k·Q obtained by multiplication of a constant k with the amount of injection Q is added to ΣSOX. The fuel contains a substantially fixed amount of sulfur S, therefore the amount of $SO_x$ absorbed in the $NO_x$ absorbent 22 can be expressed by k·Q. Therefore, the ΣSOX obtained by successively adding this k·Q shows the amount of $SO_x$ estimated to be absorbed in the $NO_x$ absorbent 22. At step 105, it is determined if this amount ΣSOX of $SO_x$ has exceeded a maximum allowable value MAX2. When ΣSOX>MAX2, the routine proceeds to step 106, where the $SO_x$ releasing flag is set.

Next, an explanation will be made of the operational control with reference to FIG. 21.

Figure 21:
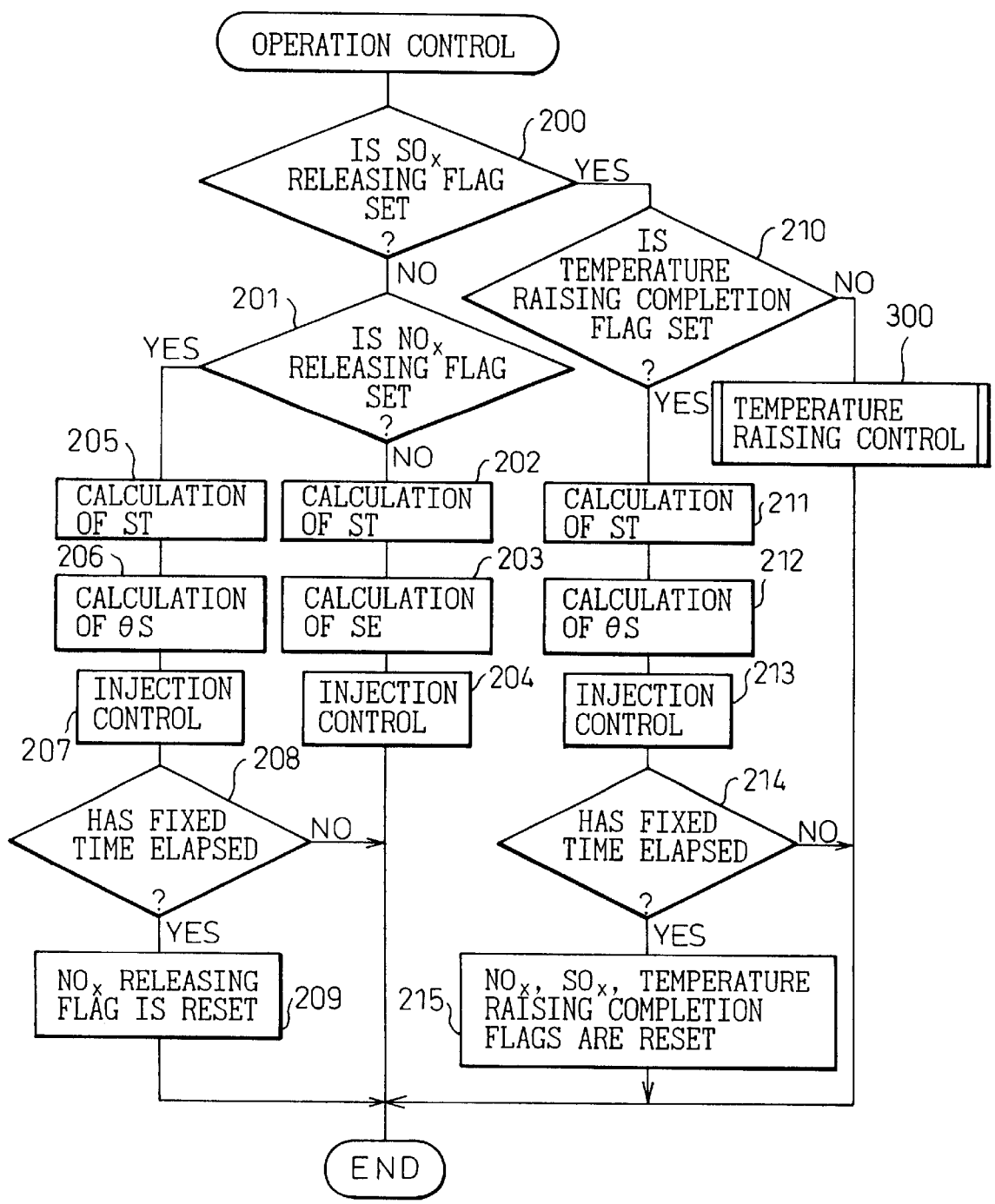
FIG. 21 is a flow chart of the control of the operation of the engine.

Referring to FIG. 21, first, at step 200, it is determined if the $SO_x$ releasing flag has been set. When the $SO_x$ releasing flag has not been set, the routine proceeds to step 201, where it is determined if the $NO_x$ releasing flag has been set. When the $NO_x$ releasing flag has not been set, the routine proceeds to step 202, where ordinary operation is performed.

That is, at step 202, the target degree of opening ST of the throttle valve 17 is calculated from the map shown in FIG. 5A and the degree of opening of the throttle valve 17 is made this target degree of opening ST. Next, at step 203, the target degree of opening SE of the EGR control valve 25 is calculated from the map shown in FIG. 5B and the degree of opening of the EGR control valve 25 is made this target degree of opening SE. Next, at step 204, the amount of injection Q is calculated from the map shown in FIG. 4A and the injection start timing θS is calculated from the map shown in FIG. 4B. The fuel is injected on the basis of these calculated values.

On the other hand, when it is determined at step 201 that the $NO_x$ releasing flag has been set, the routine proceeds to step 205, where $NO_x$ release processing for release of $NO_x$ from the $NO_x$ absorbent 22 is performed. That is, at step 205, the target degree of opening ST of the throttle valve 17 is calculated from the map shown in FIG. 16A and the degree of opening of the throttle valve 17 is made this target degree of opening ST. At this time, the EGR control valve 25 is completely closed. Next, at step 206, the injection start timing θS of the main fuel is calculated from the map shown in FIG. 16B. Next, at step 207, the main fuel is injected at the injection start timing θS calculated at step 206, then the auxiliary fuel $Q_p$ is injected during the expansion stroke.

That is, at this time, the degree of opening of the throttle valve 17 is reduced, injection is performed by the fourth injection pattern shown in FIG. 10, and thereby the air-fuel ratio of the exhaust gas flowing into the $NO_x$ absorbent 22 is made rich. Next, at step 208, it is determined if a fixed time has elapsed from when the air-fuel ratio of the exhaust gas was made rich. When a fixed time has elapsed, the routine proceeds to step 209, where the $NO_x$ releasing flag is reset. At this time, simultaneously, ΣNOX (FIG. 20) is made zero.

On the other hand, when it is judged at step 200 that the $SO_x$ releasing flag has been set, the routine proceeds to step 210, where it is determined if a temperature raising completion flag showing that the $NO_x$ absorbent 22 has been raised to a temperature enabling release of $SO_x$ has been set when the $SO_x$ releasing flag has been set, the temperature raising completion flag is reset, therefore the routine proceeds to step 300 where control is performed for raising the temperature. This control for raising the temperature is shown in FIG. 22.

Figure 22:
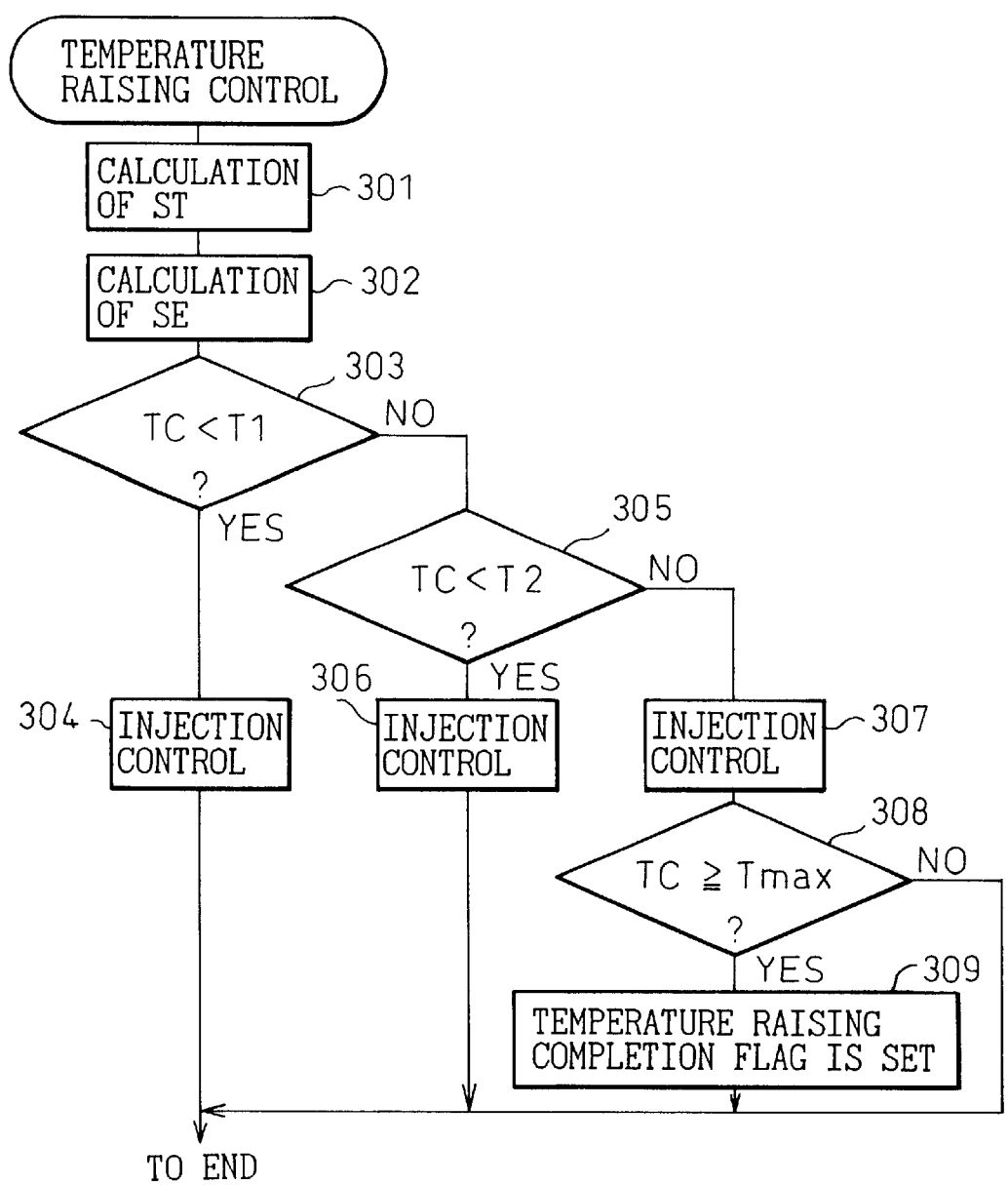
FIG. 22 is a flow chart of the control for raising the temperature.

Referring to FIG. 22, first, at step 301, the target degree of opening ST of the throttle valve 17 is calculated from the map shown in FIG. 5A and the degree of opening of the throttle valve 17 is made this target degree of opening ST. Next, at step 302, the target degree of opening SE of the EGR control valve 25 is calculated from the map shown in FIG. 5B and the degree of opening of the EGR control valve 25 is made this target degree of opening SE. Next, at step 303, it is determined if the temperature TC of the $NO_x$ absorbent 22 detected by the temperature sensor 39 is lower than a first temperature T1. When TC<T1, the routine proceeds to step 304, where injection is performed by the injection pattern determined based on (1) of FIG. 12.

On the other hand, when it is judged at step 303 that TC≧T1, the routine proceeds to step 305, where it is determined if the temperature TC of the $NO_x$ absorbent 22 detected by the temperature sensor 39 is lower than a second temperature T2. When TC<T2, the routine proceeds to step 306, where injection is performed by an injection pattern determined based on (2) of FIG. 12.

On the other hand, when it is determined at step 305 that TC≧T2, the routine proceeds to step 307, where injection is performed by the injection pattern determined based on (3) of FIG. 12. Next, at step 308, it is determined if the temperature TC of the $NO_x$ absorbent 22 detected by the temperature sensor 39 has become higher than the target temperature $T_{max}$. When TC≧$T_{max}$, the routine proceeds to step 309, where the temperature raising completion flag is set.

Returning again to FIG. 21, when the temperature raising completion flag is set, the routine proceeds to step 211, where $SO_x$ release processing is performed for releasing the $SO_x$ from the $NO_x$ absorbent 22. That is, at step 211, the target degree of opening ST of the throttle valve 17 is calculated from the map shown in FIG. 16A and the degree of opening of the throttle valve 17 is made this target degree of opening ST. At this time, the EGR control valve 25 is completely closed. Next, at step 212, the injection start timing θS of the main fuel is calculated from the map shown in FIG. 16B. Next, at step 213, the main fuel is injected at the injection start timing θS calculated at step 212, then auxiliary fuel $Q_p$ is injected during the expansion stroke.

That is, at this time, the degree of opening of the throttle valve 17 is reduced and injection is performed by the fourth injection pattern shown in FIG. 10, whereby the air-fuel ratio of the exhaust gas flowing into the $NO_x$ absorbent 22 is made just slightly rich. Next, at step 214, it is determined if a fixed time has elapsed from when the air-fuel ratio of the exhaust gas was made just slightly rich. When the fixed time has elapsed, the routine proceeds to step 215, where the $NO_x$ releasing flag, the $SO_x$ releasing flag, and the temperature raising completion flag are reset. At this time, simultaneously, ΣNOX and ΣSOX (FIG. 20) are made zero.

Figure 23:
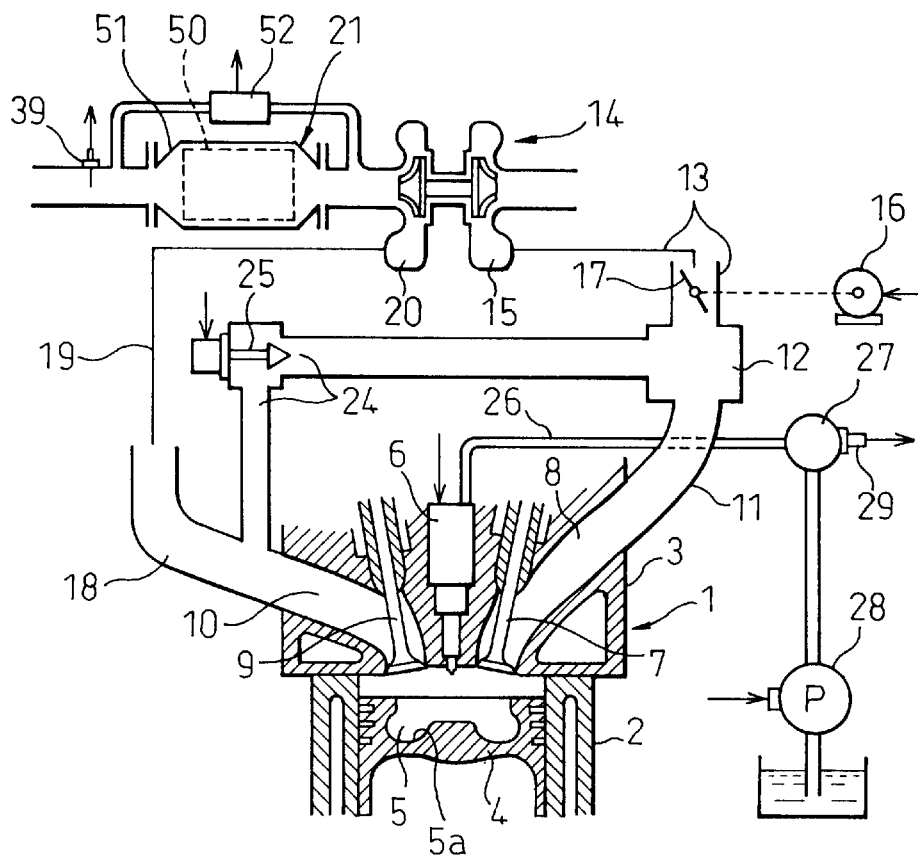
FIG. 23 is an overview of another embodiment of an internal combustion engine.

FIG. 23 shows another embodiment. In this embodiment, the exhaust gas after-treatment device 21 is comprised of a particulate filter 50 for trapping particulate matter in the exhaust gas and a casing 51 housing this particulate filter 50. Further, in this embodiment, a differential pressure sensor 52 is provided for detecting the differential pressure before and after the particulate filter 50.

The particulate matter deposited on the particulate filter 50 naturally ignites when the temperature of the particulate filter 50 passes a fixed temperature $T_0$. If it were possible to maintain the temperature of the particulate filter 50 after that to at least that fixed temperature $T_0$, then it would be possible to burn all of the particulate matter deposited on the particulate filter 50. That is, to burn all of the particulate matter deposited on the particulate filter 50, that is, when regenerating the particulate filter 50, it is necessary to first raise the temperature of the particulate filter 50 to at least the fixed temperature $T_0$ and then maintain the temperature of the particulate filter 50 at least at the fixed temperature $T_0$.

Figure 24:
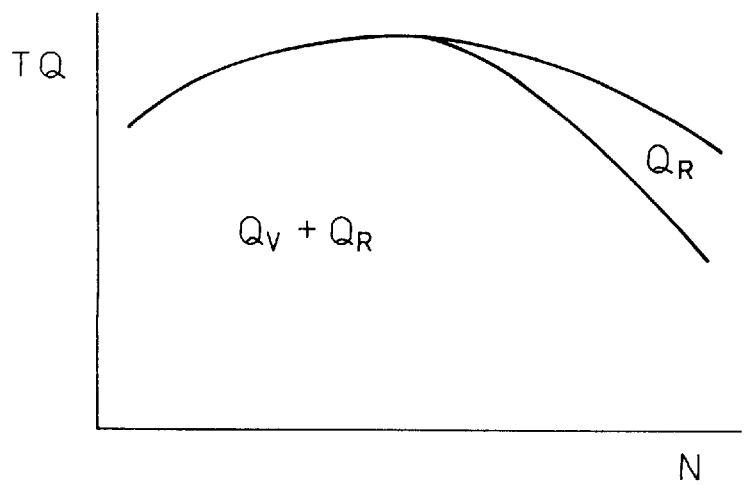
FIG. 24 is a view of an injection pattern.

Therefore, in this embodiment as well, the various injection patterns shown in FIG. 12 are used for raising the temperature of the particulate filter 50 to at least the fixed temperature $T_0$ so as to regenerate the particulate filter 50. In this case, however, TC shows the temperature of the particulate filter 50. Further, in this embodiment, when maintaining the temperature of the particulate filter 50 at least at the fixed temperature $T_0$, the injection pattern determined based on FIG. 24 is used. That is, when the temperature of the particulate filter 50 is to be held at least at the fixed temperature $T_0$, injection is performed by the first injection pattern $Q_R$ shown by (II) in FIG. 8 to FIG. 10. in the limited operating region where the required torque TQ is high and the engine rotational speed N is high and injection is performed by the second injection pattern $Q_v+Q_R$ shown by (III) in FIG. 8 or (III) in FIG. 9 in the remaining greater portion of the operating region. Note that in this embodiment, when the temperature of the particulate filter 50 is to be held at least at the fixed temperature $T_0$, the air-fuel ratio of the exhaust gas is maintained lean.

Next, an explanation will be given of the operational control while referring to FIG. 25.

Figure 25:
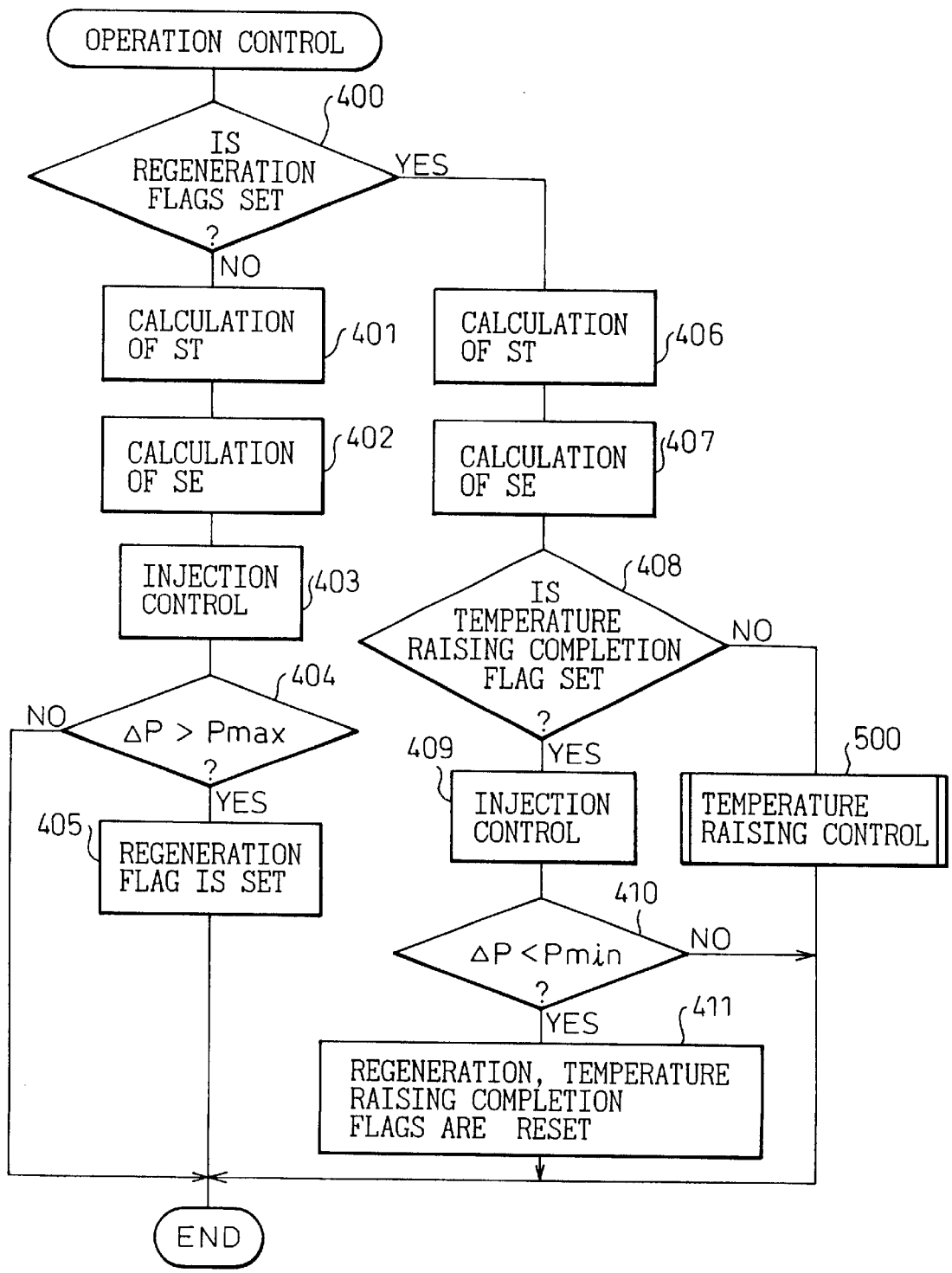
FIG. 25 is a flow chart of the control of the operation of the engine.

Referring to FIG. 25, first, at step 400, it is determined if a regeneration flag showing that the particulate filter 50 should be regenerated has been set. When the regeneration flag has not been set, the routine proceeds to step 401, where the ordinary operation is performed.

That is, at step 401, the target degree of opening ST of the throttle valve 17 is calculated from the map shown in FIG. 5A and the degree of opening of the throttle valve 17 is made that target degree of opening ST. Next, at step 402, the target degree of opening SE of the EGR control valve 25 is calculated from the map shown in FIG. 5B and the degree of opening of the EGR control valve 25 is made that target degree of opening SE. Next, at step 403, the amount of injection Q is calculated from the map shown in FIG. 4A, the injection start timing θS is calculated from the map shown in FIG. 4B, and fuel is injected based on these calculated values. Next, at step 404, it is determined if the differential pressure ΔP before and after the particulate filter 50 is more than the maximum allowable value $P_{max}$ based on the output signal of the differential pressure sensor 52, that is, if the amount of particulate matter deposited on the particulate filter 50 has exceeded a maximum allowable value. When ΔP>$P_{max}$, that is, when the amount of particulate matter deposited on the particulate filter 50 has exceeded the maximum allowable value, the routine proceeds to step 405, where the regeneration flag is set.

When the regeneration flag is set, the routine proceeds to step 406, where the target degree of opening ST of the throttle valve 17 is calculated from the map shown in FIG. 5A and the degree of opening of the throttle valve 17 is made this target degree of opening ST. Next, at step 407, the target degree of opening SE of the EGR control valve 25 is calculated from the map shown in FIG. 5B and the degree of opening of the EGR control valve 25 is made this target degree of opening SE.

Next, at step 408, it is determined if a temperature raising completion flag showing that the particulate filter 50 has been raised to a temperature enabling ignition of the particulate matter on the particulate filter 50 has been set. When the regeneration flag has been set, normally the temperature raising completion flag is reset, therefore the routine proceeds to step 500, where the control for raising the temperature is performed. This control for raising the temperature is shown in FIG. 26.

Figure 26:
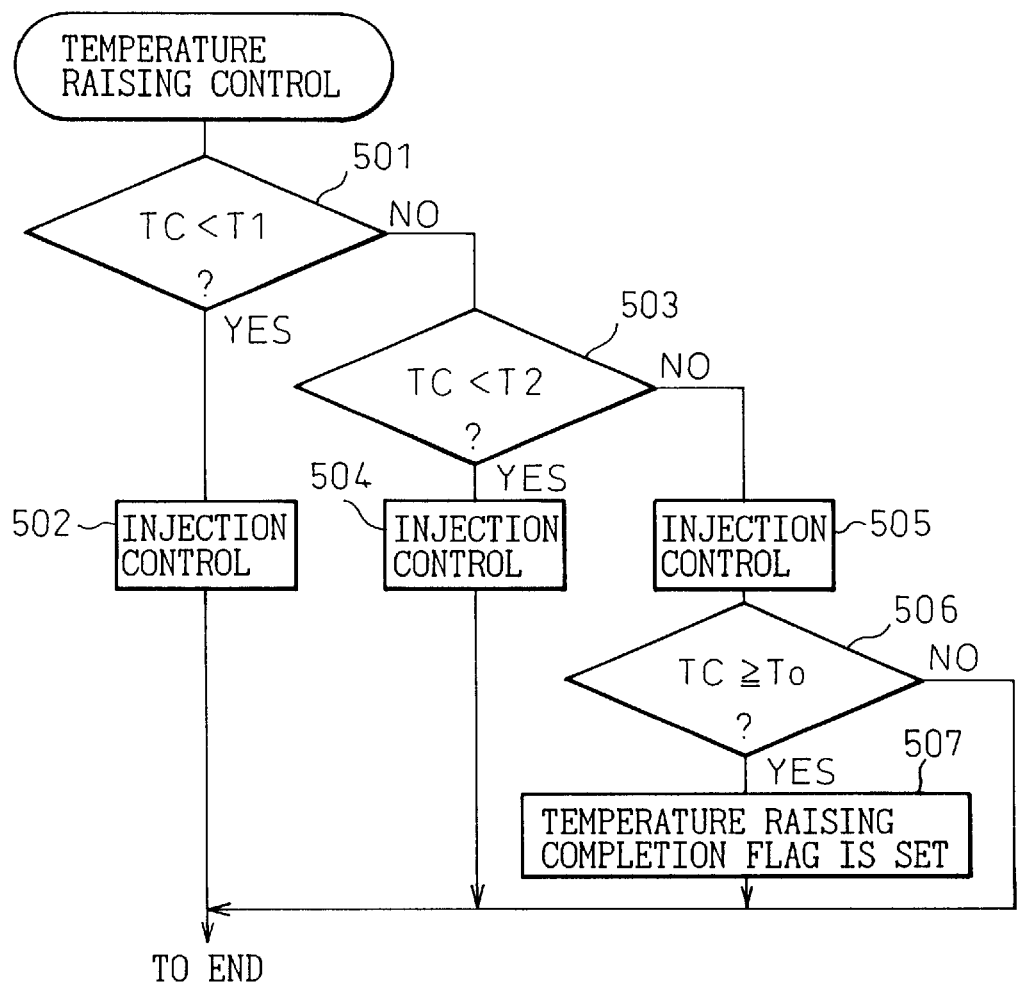
FIG. 26 is a flow chart of the control for raising the temperature.

Referring to FIG. 26, first, at step 501, it is determined if the temperature TC of the particulate filter 50 detected by the temperature sensor 39 is lower than the first temperature T1. When TC<T1, the routine proceeds to step 502, where injection is performed by the injection pattern determined based on (1) of FIG. 12.

On the other hand, when it is determined at step 501 that TC≧T1, the routine proceeds to step 503, where it is determined if the temperature TC of the particulate filter 50 detected by the temperature sensor 39 is lower than the second temperature T2. When TC<T2, the routine proceeds to step 504, where injection is performed by the injection pattern determined based on (2) of FIG. 12.

On the other hand, when it is determined at step 503 that TC≧T2, the routine proceeds to step 505, where injection is performed by the injection pattern determined based on (3) of FIG. 12. Next, at step 506, it is determined if the temperature TC of the particulate filter 50 detected by the temperature sensor 39 has become higher than the targeted fixed temperature $T_0$. When TC≧$T_0$, the routine proceeds to step 507, where the temperature raising completion flag is set.

Returning again to FIG. 25, when the temperature raising completion flag has been set, the routine proceeds to step 409, where the temperature of the particulate filter 50 is held at least at the fixed temperature $T_0$. That is, at this time, injection is performed by the injection pattern determined based on FIG. 24. Next, at step 410, it is determined if the differential pressure ΔP before and after the particulate filter 50 has become lower than a minimum value $P_{min}$ based on the output signal of the differential pressure sensor 52, that is, if all of the particulate matter deposited on the particulate filter 50 has been burned. When ΔP<$P_{min}$, the routine proceeds to step 411, where the regeneration flag and the temperature raising completion flag are reset.

Note that it is also possible to arrange a catalyst having an oxidation function such as an oxidation catalyst or a three-way catalyst inside the exhaust passage upstream or downstream of the $NO_x$ absorbent 22 in the first embodiment and inside the exhaust gas upstream or downstream of the particulate filter 50 in the second embodiment.

According to the present invention, as explained above, it is possible to raise the temperature of an exhaust gas after-treatment device at a temperature raising rate required for the exhaust gas after-treatment device.

While the invention has been described by reference to specific embodiments chosen for purposes of illustration, it should be apparent that numerous modifications could be made thereto by those skilled in the art without departing from the basic concept and scope of the invention.

What is claimed is:

1. An internal combustion engine having a combustion chamber and an exhaust passage, said engine comprising:

fuel injection means for injecting an auxiliary fuel into the combustion chamber, in addition to a main fuel, in accordance with necessity to produce unburned hydrocarbons;

an exhaust gas after-treatment device arranged in the exhaust passage, a temperature of said exhaust gas after-treatment device rising when a temperature of exhaust gas rises and rising when unburned hydrocarbons are supplied to said exhaust gas after-treatment device; and injection control means for retarding an injection timing of the main fuel when the temperature of the exhaust gas after-treatment device should rise, as compared with the case where the temperature of the exhaust gas after-treatment device should not rise, at least two injection patterns, which are different in at least one of an amount of retardation of the injection timing of the main fuel and injection timing of the auxiliary fuel, being determined in advance to raise the temperature of the exhaust gas after-treatment device, said injection control means cyclically choosing any one of the injection patterns in accordance with a demand for a temperature raising rate of the exhaust gas after-treatment device and injecting fuel in accordance with the chosen injection pattern when the temperature of the exhaust gas after-treatment device should rise.

2. An internal combustion engine as set forth in claim 1, wherein at least two injection patterns are preset for raising the temperature of the exhaust gas after-treatment device from among a first injection pattern delaying the injection timing of the main fuel without injecting the auxiliary fuel, a second injection pattern injecting the auxiliary fuel before injection of the main fuel and delaying the injection timing of the main fuel, a third injection pattern injecting the auxiliary fuel before injection of the main fuel and after injection of the main fuel and delaying the injection timing of the main fuel, and a fourth injection pattern injecting the auxiliary fuel after injection of the main fuel and delaying the injection timing of the main fuel, and said injection control means selects one of the injection patterns from among the preset injection patterns and injects the main fuel and auxiliary fuel in accordance with the selected injection pattern.

3. An internal combustion engine as set forth in claim 2, wherein, in the first injection pattern, the injection timing of the main fuel is delayed until after top dead center of the compression stroke.

4. An internal combustion engine as set forth in claim 2, wherein, in the second injection pattern, the auxiliary fuel is injected near top dead center of the suction stroke and the amount of retardation of the injection timing of the main fuel is made larger than the amount of retardation of the injection timing of the main fuel in the first injection pattern.

5. An internal combustion engine as set forth in claim 4, wherein the auxiliary fuel is injected when an exhaust valve is open.

6. An internal combustion engine as set forth in claim 4, wherein the injection timing of the auxiliary fuel is determined so that the injected auxiliary fuel is directed to a cavity formed in a top face of a piston.

7. An internal combustion engine as set forth in claim 2, wherein, in the second injection pattern, the auxiliary fuel is injected during the compression stroke and the amount of retardation of the injection timing of the main fuel is made larger than the amount of retardation of the injection timing of the main fuel in the first injection pattern.

8. An internal combustion engine as set forth in claim 7, wherein the injection timing of the auxiliary fuel is determined so that the injected auxiliary fuel is directed to a cavity formed in a top face of a piston.

9. An internal combustion engine as set forth in claim 2, wherein, in the third injection pattern, first auxiliary fuel is injected near top dead center of the suction stroke, second auxiliary fuel is injected during the expansion stroke or exhaust stroke, and the amount of retardation of the injection timing of the main fuel is made larger than the amount of retardation of the injection timing of the main fuel in the first injection pattern.

10. An internal combustion engine as set forth in claim 9, wherein the first auxiliary fuel is injected when an exhaust valve is open.

11. An internal combustion engine as set forth in claim 9, wherein the injection timing of the first auxiliary fuel is determined so that the injected auxiliary fuel is directed to a cavity formed in a top face of a piston.

12. An internal combustion engine as set forth in claim 9, wherein the second auxiliary fuel is injected during an expansion stroke before an exhaust valve opens.

13. An internal combustion engine as set forth in claim 9, wherein the second auxiliary fuel is injected at intervals over several times.

14. An internal combustion engine as set forth in claim 2, wherein, in the third injection pattern, the first auxiliary fuel is injected during the compression stroke, the second auxiliary fuel is injected during the expansion stroke or exhaust stroke, and the amount of retardation of the injection timing of the main fuel is made larger than the amount of retardation of the injection timing of the main fuel in the first injection pattern.

15. An internal combustion engine as set forth in claim 14, wherein the injection timing of the first auxiliary fuel is determined so that the injected auxiliary fuel is directed to a cavity formed in a top face of a piston.

16. An internal combustion engine as set forth in claim 14, wherein the second auxiliary fuel is injected during the expansion stroke before an exhaust valve opens.

17. An internal combustion engine as set forth in claim 14, wherein the second auxiliary fuel is injected at intervals over several times.

18. An internal combustion engine as set forth in claim 2, wherein, in the fourth injection pattern, the injection timing of the main fuel is delayed until after the top dead center of the compression stroke and the auxiliary fuel is injected during the expansion stroke or exhaust stroke.

19. An internal combustion engine as set forth in claim 18, wherein the auxiliary fuel is injected during the expansion stroke before an exhaust valve opens.

20. An internal combustion engine as set forth in claim 18, wherein the auxiliary fuel is injected at intervals over several times.

21. An internal combustion engine as set forth in claim 2, wherein when the temperature of the exhaust gas after-treatment device should be raised, while the temperature of the exhaust gas after-treatment device is rising, the injection pattern is switched in accordance with need from the third injection pattern to the second injection pattern, from the second injection pattern to the first injection pattern, or from the third injection pattern to the second injection pattern to the first injection pattern.

22. An internal combustion engine as set forth in claim 2, wherein when the temperature of the exhaust gas after-treatment device should be raised, which of the injection patterns to use is determined in accordance with the temperature of the exhaust gas after-treatment device.

23. An internal combustion engine as set forth in claim 2, wherein when the temperature of the exhaust gas after-treatment device should be raised, which of the injection patterns to use is determined in accordance with the temperature of the exhaust gas after-treatment device and the operating state of the engine.

24. An internal combustion engine as set forth in claim 23, wherein a first operating region where fuel is injected by the first injection pattern, a second operating region where fuel is injected by the second injection pattern, and a third operating region where fuel is injected by the third injection pattern are preset in accordance with the temperature of the exhaust gas after-treatment device and the operating state of the engine.

25. An internal combustion engine as set forth in claim 24, wherein when the temperature of the exhaust gas after-treatment device is lower than a predetermined temperature, the majority of the operating region becomes the third operating region and when the temperature of the exhaust gas after treatment device becomes higher than the predetermined temperature, the third operating region is reduced to a smaller region on the low load side.

26. An internal combustion engine as set forth in claim 25, wherein the second operating region is positioned at the high load side of the third operating region and when the temperature of the exhaust gas after-treatment device becomes higher, the second operating region shifts to the low load side.

27. An internal combustion engine as set forth in claim 26, wherein the first operating region is positioned at the high load side of the second operating region and when the temperature of the exhaust gas after-treatment device becomes higher, the first operating region shifts to the low load side.

28. An internal combustion engine as set forth in claim 1, wherein the exhaust gas after-treatment device comprises an $NO_x$ absorbant which absorbs $NO_x$ when an air-fuel ratio of the exhaust gas is lean and releases the $NO_x$ when the air-fuel ratio of the exhaust gas becomes the stoichiometric air-fuel ratio or rich and the temperature of the $NO_x$ absorbant is raised when $SO_x$ is to be released from the $NO_x$ absorbant.

29. An internal combustion engine as set forth in claim 28, wherein the air-fuel ratio of the exhaust gas is made the stoichiometric air-fuel ratio or rich so as to release the $SO_x$ from the $NO_x$ absorbant after the temperature of the $NO_x$ absorbant exceeds a predetermined target temperature.

30. An internal combustion engine as set forth in claim 29, wherein intake air control means is provided for controlling an amount of intake air and, when $SO_x$ is to be released from the $NO_x$ absorbant, the amount of intake air is reduced by the intake air control means, the injection timing of the main fuel is delayed compared with when the temperature of the $NO_x$ absorbant should not be raised, and the auxiliary fuel is injected during the expansion stroke or exhaust stroke, whereby the air-fuel ratio of the exhaust gas is made the stoichiometric air-fuel ratio or rich.

31. An internal combustion engine as set forth in claim 30, wherein said auxiliary fuel is injected during an expansion stroke before an exhaust valve opens.

32. An internal combustion engine as set forth in claim 30, wherein the auxiliary fuel is injected at intervals over several times.

33. An internal combustion engine as set forth in claim 1, wherein the exhaust gas after-treatment device comprises a particulate filter for trapping particulate matter contained in the exhaust gas and the temperature of the particulate filter is raised when the particulate matter trapped by the particulate filter is to be burned.

34. An internal combustion engine as set forth in claim 33, wherein when the temperature of the particulate filter exceeds a predetermined temperature, the particulate matter trapped by the particulate filter is burned and, when the particulate matter is burned, the injection timing of the main fuel is delayed compared with when the temperature of the particulate filter should not be raised and the auxiliary fuel is injected before the injection of the main fuel.

35. An internal combustion engine as set forth in claim 34, wherein said auxiliary fuel is injected near top dead center of the suction stroke.

36. An internal combustion engine as set forth in claim 34, wherein said auxiliary fuel is injected during a compression stroke.

* * * * *

UNITED STATES PATENT AND TRADEMARK OFFICE
CERTIFICATE OF CORRECTION

PATENT NO.    : 6,378,297 B1
DATED         : April 30, 2002
INVENTOR(S)   : Takekazu Ito et al.

It is certified that error appears in the above-identified patent and that said Letters Patent is hereby corrected as shown below:

<u>Title Page,</u>
Item [54], should read as follows:
-- [54]  AIR-FUEL CONTROL SYSTEM FOR EXHAUST GAS PURIFICATION IN INTERNAL COMBUSTION ENGINE --

Signed and Sealed this

Twenty-second Day of October, 2002

*Attest:*

*Attesting Officer*

JAMES E. ROGAN
*Director of the United States Patent and Trademark Office*